United States Patent
Krammer

(10) Patent No.: US 6,802,408 B2
(45) Date of Patent: Oct. 12, 2004

(54) FLUID DAMPER, PARTICULARLY FOR MOVABLE PIECES OF FURNITURE

(75) Inventor: Bernhard Krammer, Höchst (AT)

(73) Assignee: Julius Blum Gesellschaft m.b.H, Hochst (AT)

( * ) Notice: Subject to any disclaimer, the term of this patent is extended or adjusted under 35 U.S.C. 154(b) by 0 days.

(21) Appl. No.: 10/276,489

(22) PCT Filed: Mar. 12, 2002

(86) PCT No.: PCT/AT02/00080
§ 371 (c)(1),
(2), (4) Date: Nov. 15, 2002

(87) PCT Pub. No.: WO02/073064
PCT Pub. Date: Sep. 19, 2002

(65) Prior Publication Data
US 2003/0075845 A1 Apr. 24, 2003

(30) Foreign Application Priority Data
Mar. 13, 2001 (AT) ........................ A 390/2001

(51) Int. Cl.[7] ................................. F16F 9/34
(52) U.S. Cl. ............. 188/322.15; 188/282.1; 188/282.5; 188/282.8; 188/322.22
(58) Field of Search .................. 267/64.11; 188/322.15, 188/322.22, 320, 297, 282.1, 282.5, 316, 317, 288, 282.6

(56) References Cited

U.S. PATENT DOCUMENTS

| | | | |
|---|---|---|---|
| 2,360,993 A | | 10/1944 | Whisler, Jr. |
| 4,197,929 A | * | 4/1980 | Imai ............................ 188/320 |
| 4,203,507 A | * | 5/1980 | Tomita et al. .............. 188/317 |
| 4,372,545 A | | 2/1983 | Federspiel |
| 4,895,229 A | * | 1/1990 | Kato .......................... 188/282 |
| 5,042,624 A | * | 8/1991 | Furuya et al. .............. 188/280 |
| 5,219,181 A | * | 6/1993 | Lund .......................... 280/772 |
| 5,316,113 A | * | 5/1994 | Yamaoka .................... 188/282 |
| 5,542,508 A | | 8/1996 | Van Erden et al. |
| 6,116,388 A | * | 9/2000 | Bataille et al. .......... 188/282.6 |

FOREIGN PATENT DOCUMENTS

| | | |
|---|---|---|
| DE | 528780 | 6/1931 |
| DE | 2031158 | 12/1971 |
| DE | 19623005 A1 | 1/1997 |
| EP | 0473526 A1 | 3/1992 |
| EP | 0955483 | 11/1999 |
| FR | 1.255.829 | 3/1961 |
| FR | 2426187 | 12/1979 |
| FR | 2796690 | 1/2001 |
| GB | 728495 | 4/1955 |
| JP | 2-31041 A * | 2/1990 ............ 188/322.22 |

* cited by examiner

Primary Examiner—Matthew C. Graham
Assistant Examiner—Mariano Sy
(74) Attorney, Agent, or Firm—Wenderoth, Lind & Ponack L.L.P.

(57) ABSTRACT

A fluid damper, in particular for moving furniture parts, includes a cylinder and a piston linearly displaceable within the cylinder. The piston has at least one opening for a damping fluid provided in the cylinder, and the fluid damper further includes at least one movable ring disk in the area of the opening(s). The at least one ring disk (8, 9, 10, 11) is arranged such that it at least partially covers the opening(s) (15) of the piston (3) during the damping stroke of the piston (3).

28 Claims, 25 Drawing Sheets

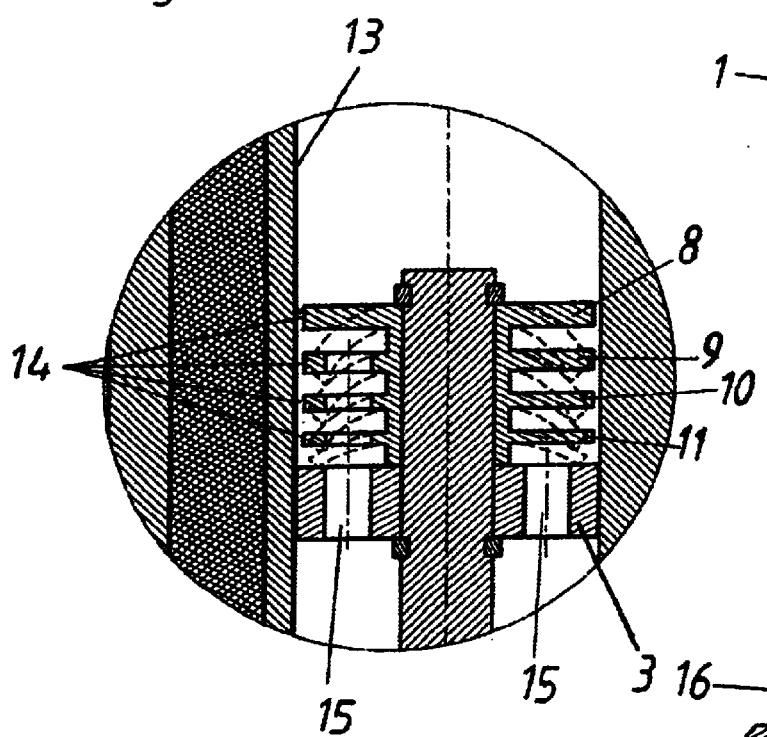
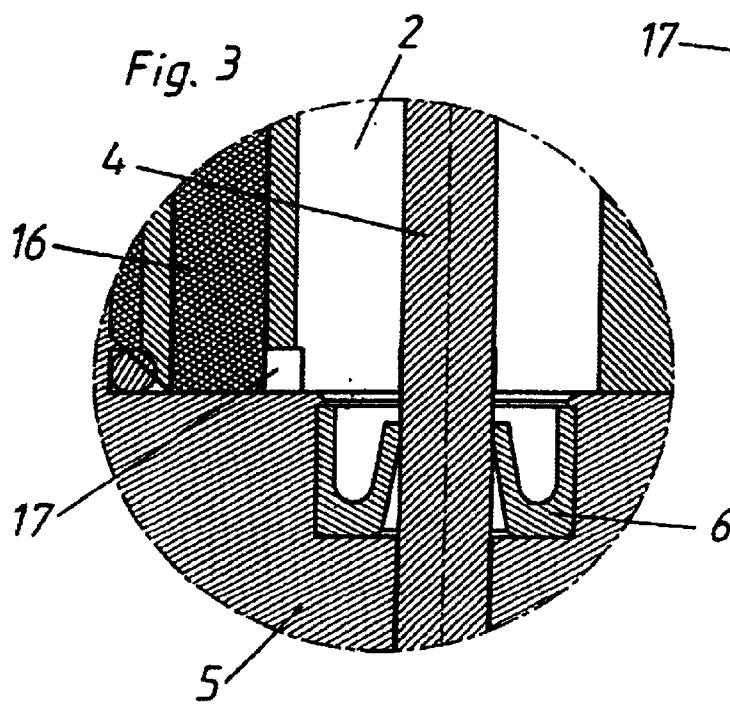
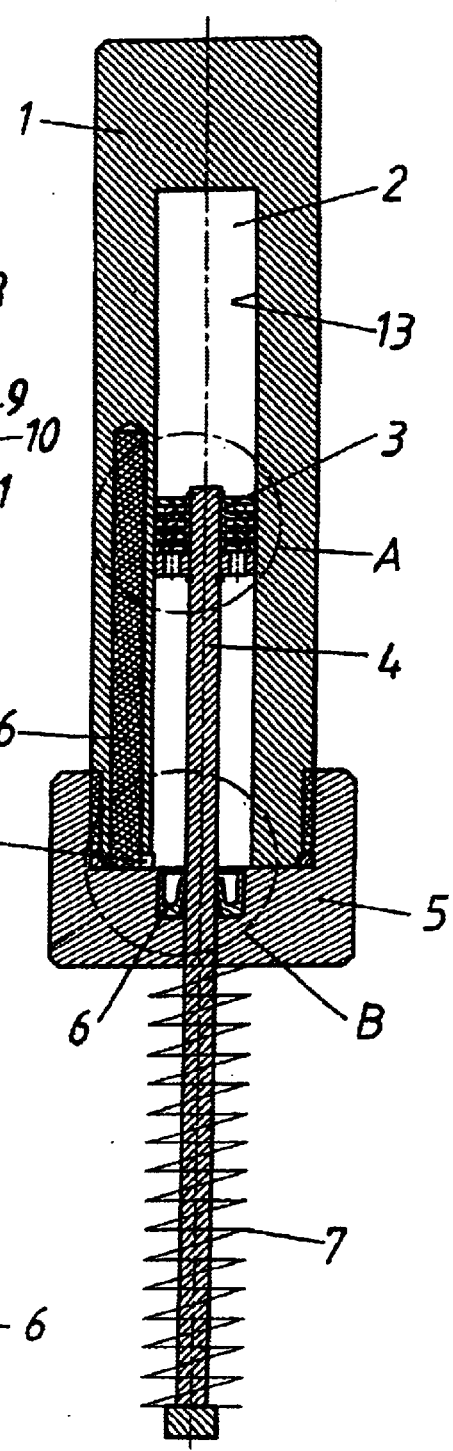

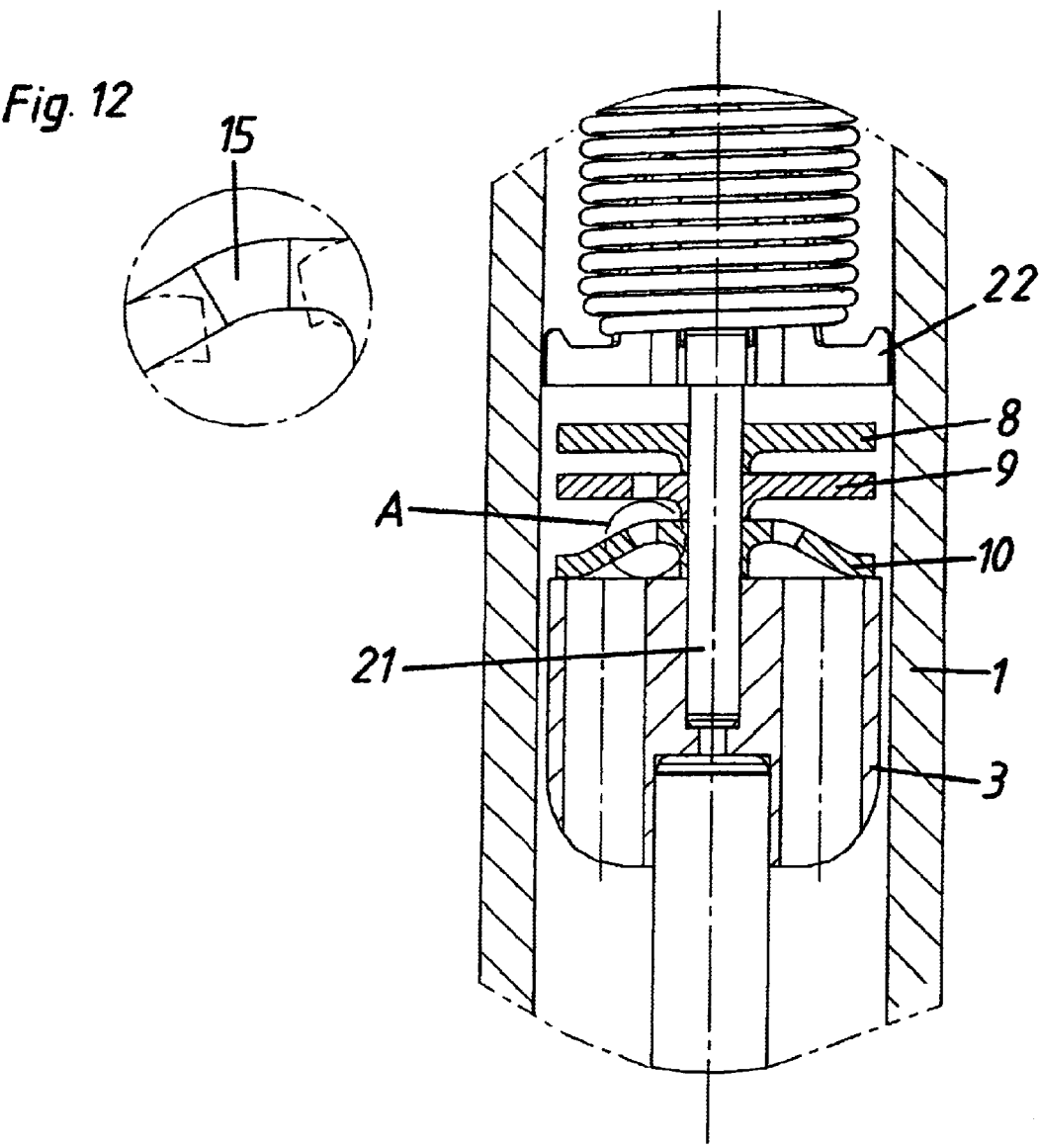

US 6,802,408 B2

FLUID DAMPER, PARTICULARLY FOR MOVABLE PIECES OF FURNITURE

BACKGROUND OF THE INVENTION

The invention relates to a fluid damper, in particular for moving furniture parts, with a cylinder and a piston linearly displaceable therein. The piston has at least one opening for a damping fluid provided in the cylinder, and has at least one movable ring disk in the area of the opening(s). Such fluid dampers are used in order, for example, to damp out the closure motion of moving furniture parts such as furniture doors, shutters or drawers, in the rearmost closing area.

According to the known state of the art, the cylinder is preferably attached to the furniture body, for example a furniture side or a furniture base, and the furniture doors or the front panel of a drawer strikes the piston rod of the piston during closing. The damping results from the flow resistance of the damping fluid when the piston is displaced. A hydraulic fluid, for example an oil (silicone oil), is preferably used as damping fluid. However gases, in particular air, can also be used.

The object of the invention is to improve a fluid damper of the type mentioned at the outset such that its damping-out action is better matched to the speed of the moved furniture part.

SUMMARY OF THE INVENTION

The object according to the invention is achieved by arranging the at least one ring disk such that it at least partially covers the opening(s) during the damping stroke of the piston.

An embodiment of the invention provides that the ring disk(s) is or are elastically bendable during the damping stroke.

It is advantageously provided that the ring disks have different rigidities, which is achieved for example by the ring disks having different thicknesses or being made of different materials.

A further embodiment of the invention provides that the piston is fitted with a pin on which the ring disks are housed so as to be axially displaceable. Springs are provided which, in the resting position of the piston, separate the ring disks from the piston and from one another. Three or four elastically movable ring disks are preferably provided.

Upon insertion of the piston rod, the hydraulic fluid flows through the ring gaps between the ring disks and the cylinder wall and through the openings in the piston. Depending on the speed of the moved furniture part and thus of the piston, the elastically bendable ring disks are bent back as a result of the flow resistance or the springs between the ring disks are compressed. The greater the flow resistance thus produced, the smaller the effective throughflow diameter of the openings as the front ring disk in each case partly or fully covers the openings of the rings located behind it. The speed of the piston decreases accordingly. If the piston slows, the flow resistance also becomes smaller and the ring disks move back into their starting position, as a result of which the effective diameter of the openings is enlarged.

BRIEF DESCRIPTION OF THE DRAWINGS

Various embodiments of the invention will be explained below using the figures of the attached drawings, in which:

FIG. 1 is a longitudinal section view through a fluid damper according to the invention;

FIG. 2 is a cut section view A of FIG. 1;

FIG. 3 is a cut section view B of FIG. 1;

FIG. 11 is a longitudinal section view through a fluid damper in the area of the piston during the dampening;

FIG. 12 is an enlarged view of detail A in FIG. 11;

DETAILED DESCRIPTION OF THE INVENTION

Figure 4:
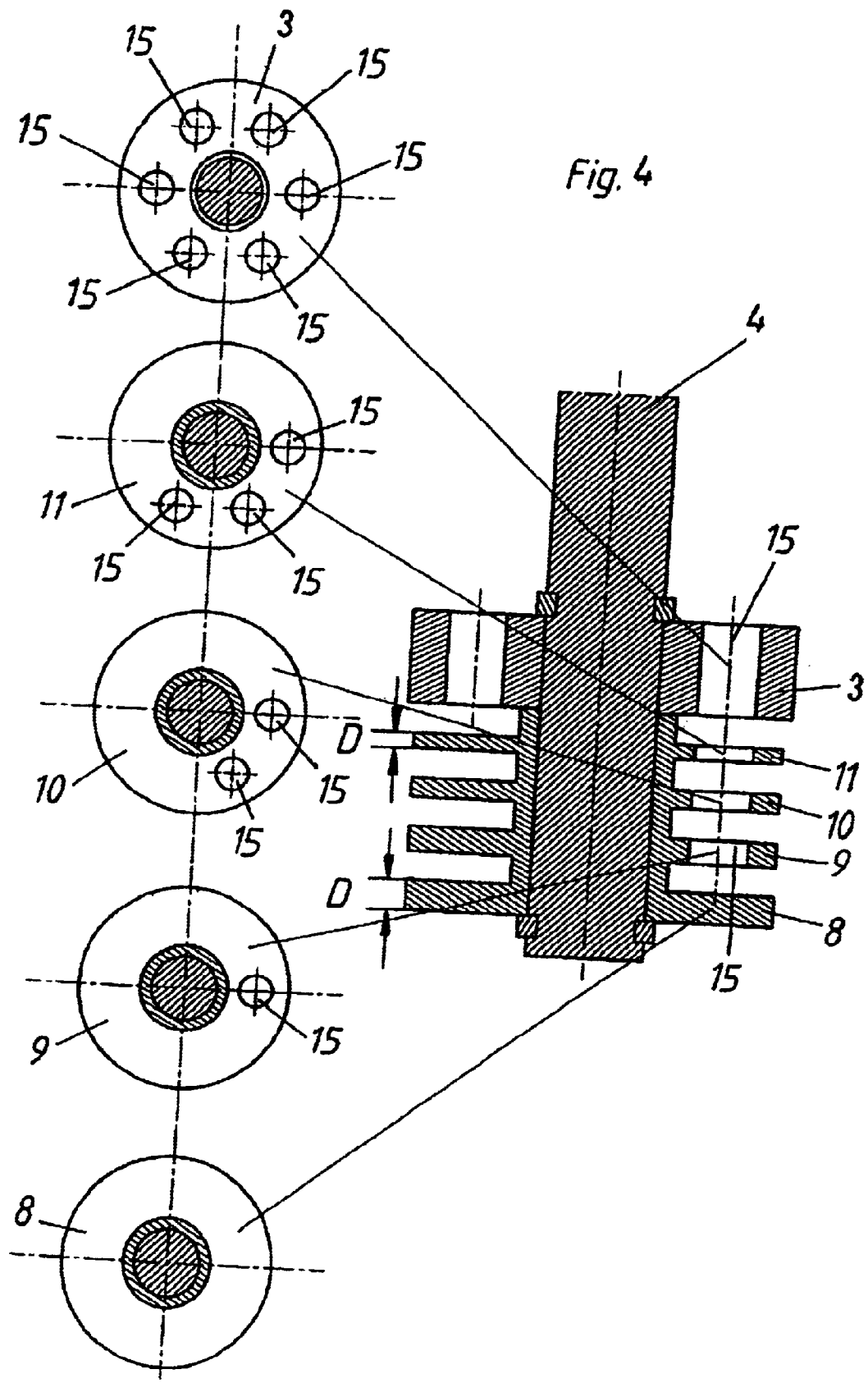
FIG. 4 is a longitudinal section view through a piston according to the invention.

The fluid damper according to the invention includes, in a customary manner, a cylinder 1 having a cylinder chamber 2 in which a piston 3 is displaceable. The piston 3 sits at the end of a piston rod 4 which projects through an end-wall 5 of the cylinder 1. A seal 6, which seals off the piston rod 4, is provided in the end-wall 5. Housed on the piston rod 4 outside the cylinder in the embodiment according to FIG. 1, is a spring 7. After damping is completed, the spring 7 moves the piston 3 via the piston rod 4 and, in the case of opened furniture parts, back into the operating position. Spring 7 can also be arranged in the cylinder 1.

In the embodiment according to FIGS. 1 to 4, four elastically bendable ring disks 8, 9, 10, 11 (first ring, second ring, third ring, and fourth ring, respectively) are arranged at the front of the piston 3. The elastically bendable ring disks 8, 9, 10, 11 are made, for example, of a rubber or a plastics material. The piston 3 can likewise be made of plastic or a metal. Ring gaps 14 are formed between the elastically bendable ring disks 8, 9, 10, 11 and the cylinder wall 13.

The first ring disk 8, which is foremost (i.e., in the front) relative to the direction of the damping movement, has no opening. However, the second elastically bendable ring disk 9 is provided with an opening 15, the third elastically bendable ring disk 10 has two openings 15, and the fourth elastically bendable ring disk 11 has three openings 15. The piston 3 itself has six openings 15.

The ring disks 8, 9, 10, 11 have different thicknesses. During the damping movement, at a relatively high speed of the piston 3, the elastically bendable ring disks 8, 9, 10, 11 are bent back as shown by the dotted lines in FIG. 2 so that the opening 15 or the openings 15 of the ring disks 9, 10, 11 or the piston 3 located behind them are covered. In this way, the throughflow volume of the hydraulic fluid decreases, and the piston 3 is stopped (breaks) more sharply. At a higher advance speed of the piston 3, all the openings 15 of the piston 3 are covered. In the resting position, regardless of the position of the piston 3, the six openings 15 in the piston 3 are opened. They also remain opened when the piston 3 is again moved back into the ready position.

In the embodiment shown, at least one side chamber 16, which is connected to the cylinder chamber 2 via a channel 17, is provided in the cylinder wall. In the embodiment, the side chamber 16 is filled with a filling material, e.g. sponge rubber. The side chamber 16 serves to balance the volume of the piston rod 4.

In the embodiment according to FIGS. 5 to 9, the piston 3 is provided with a pin 21 on which three ring disks 8, 9, 10 are housed so as to be axially displaceable along pin 21. In contrast to the embodiment described above in which the ring disks 8, 9, 10, 11 are developed on a common hub, the ring disks 8, 9, 10 in this embodiment are developed as separate disks divided from (not integrally connected to) one another. Each ring disk 8, 9, 10 has in the area of the hub a ring projection 18, 19, 20, on which it rests against the front of adjacent ring disk 9, 10 or piston 3. The terms front (forward) and back (reverse) are to be understood in this context as referring to the direction of movement of the piston 3 during damping. In other words, during damping the piston 3 moves forward (so that when moving forward, the piston 3 moves toward to top of the page in FIGS. 1 and 5.

A star-shaped guide 22, which rests against the inner cylinder wall, is arranged at the tip (front end) of the pin 21. For this purpose, there can be a ring gap 23 between the piston 3 and the cylinder wall. The guide 22 also serves to support the spring 7 which is arranged in this embodiment in the cylinder 1 (i.e., within cylinder chamber 2).

Figure 5:
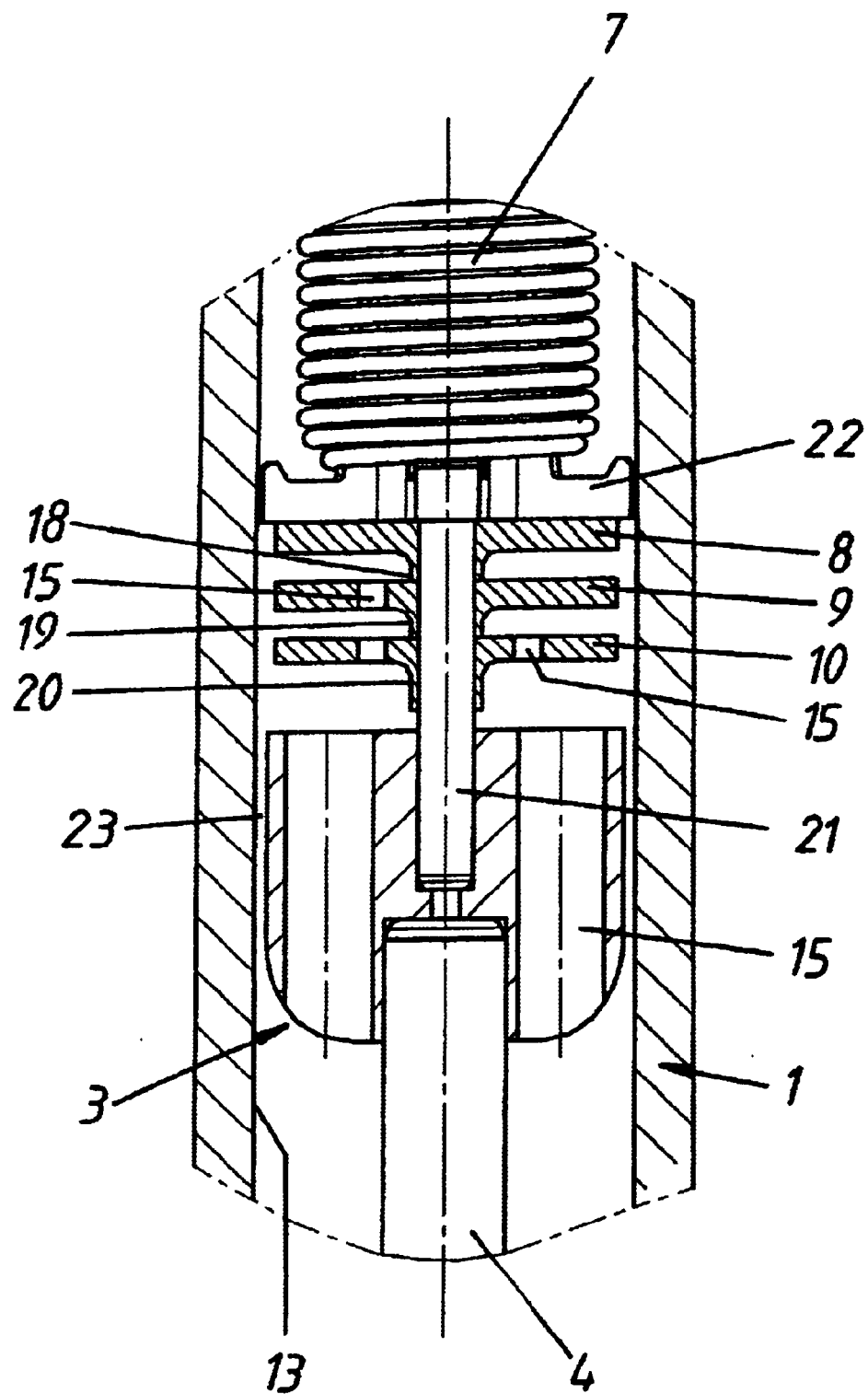
FIG. 5 is a partial section view of the area of the piston in a further embodiment of the invention.

FIG. 5 shows the piston 3 and the ring disks 8, 9, 10 in the open and resting position. The ring disk 8 rests against the guide 22, the ring disk 9 resets against the ring disk 8, and the ring disk 10 resets against the ring disk 9.

Figure 6:
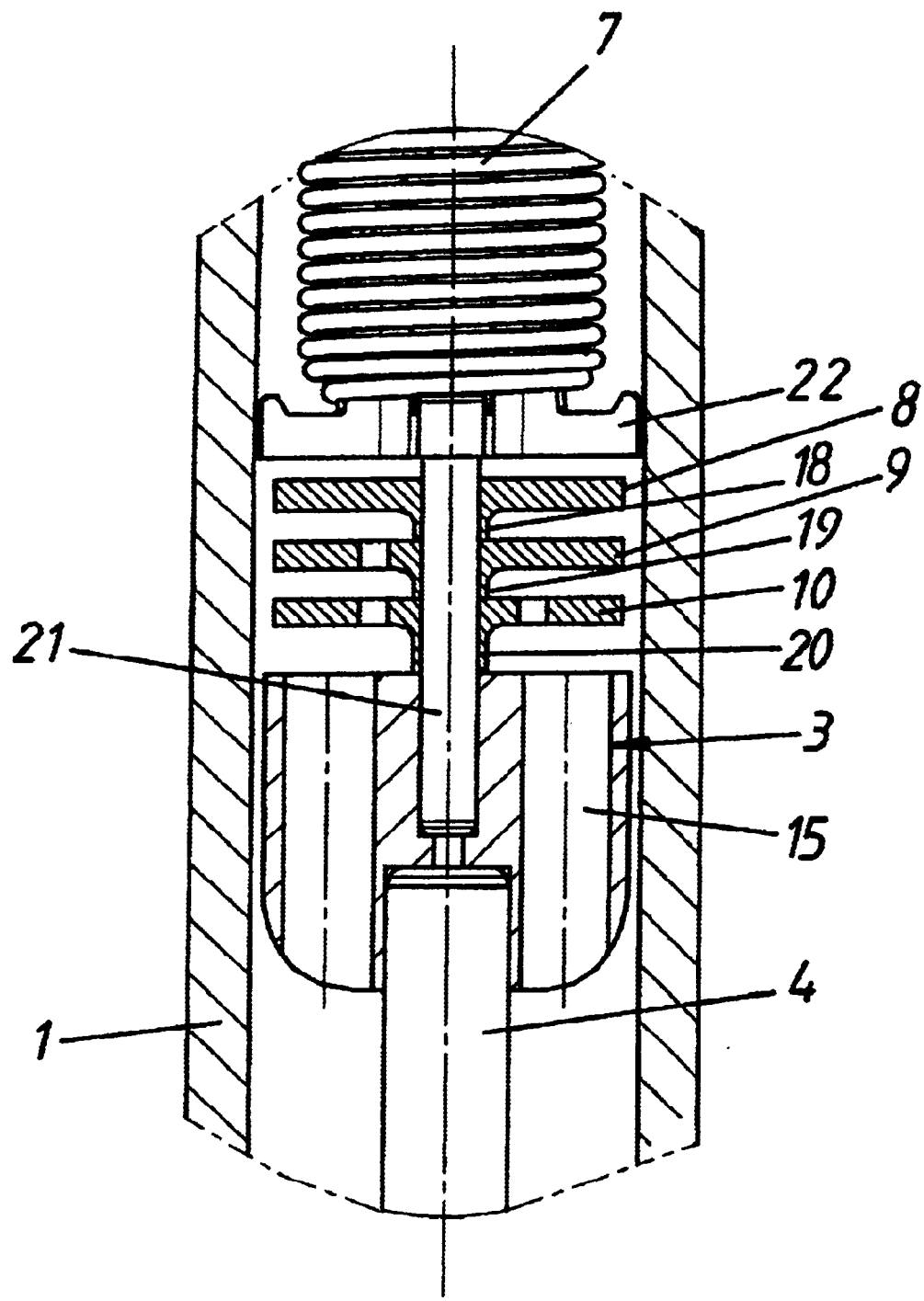
FIG. 6 is a longitudinal section view in the area of the piston through a fluid damper according to the further embodiment of the invention in the return position during a damping at low speed.
Figure 7:
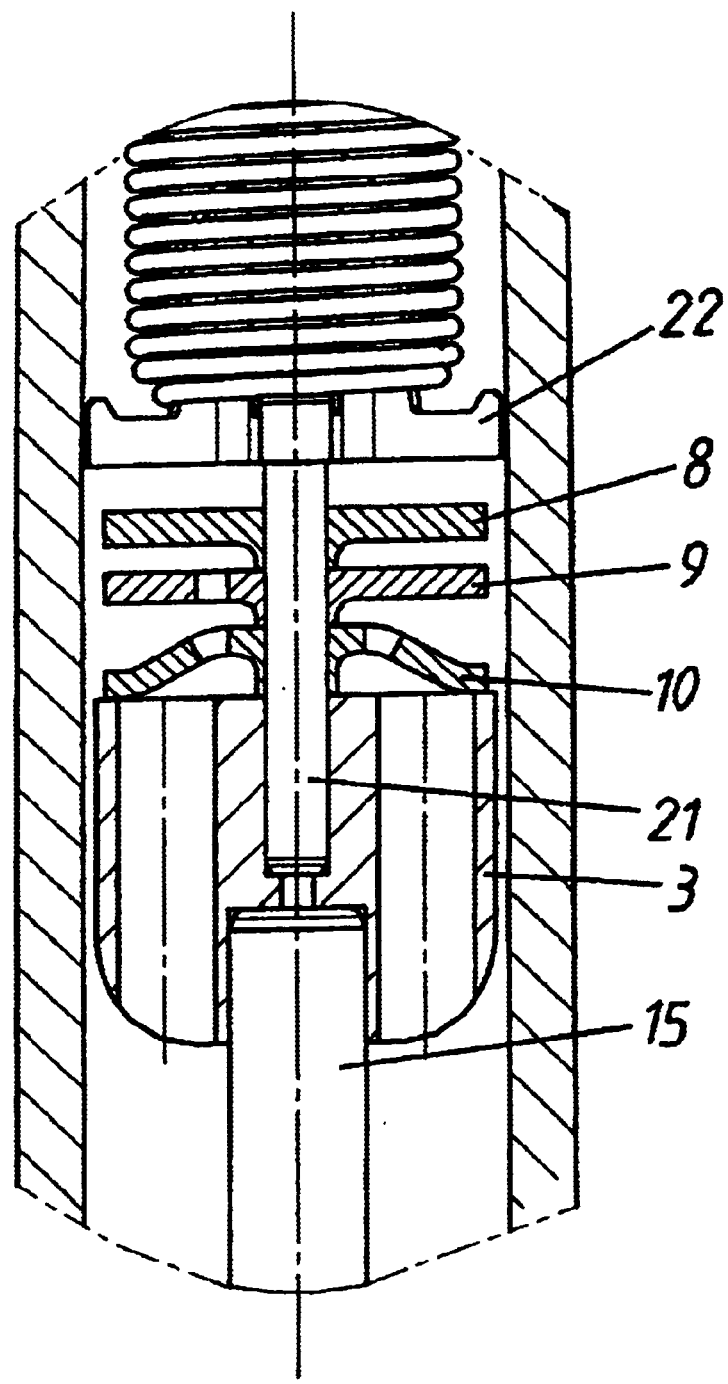
FIGS. 7 to 9 are longitudinal section views through the fluid damper according to FIGS. 5 and 6 in various damping stages.
Figure 8:
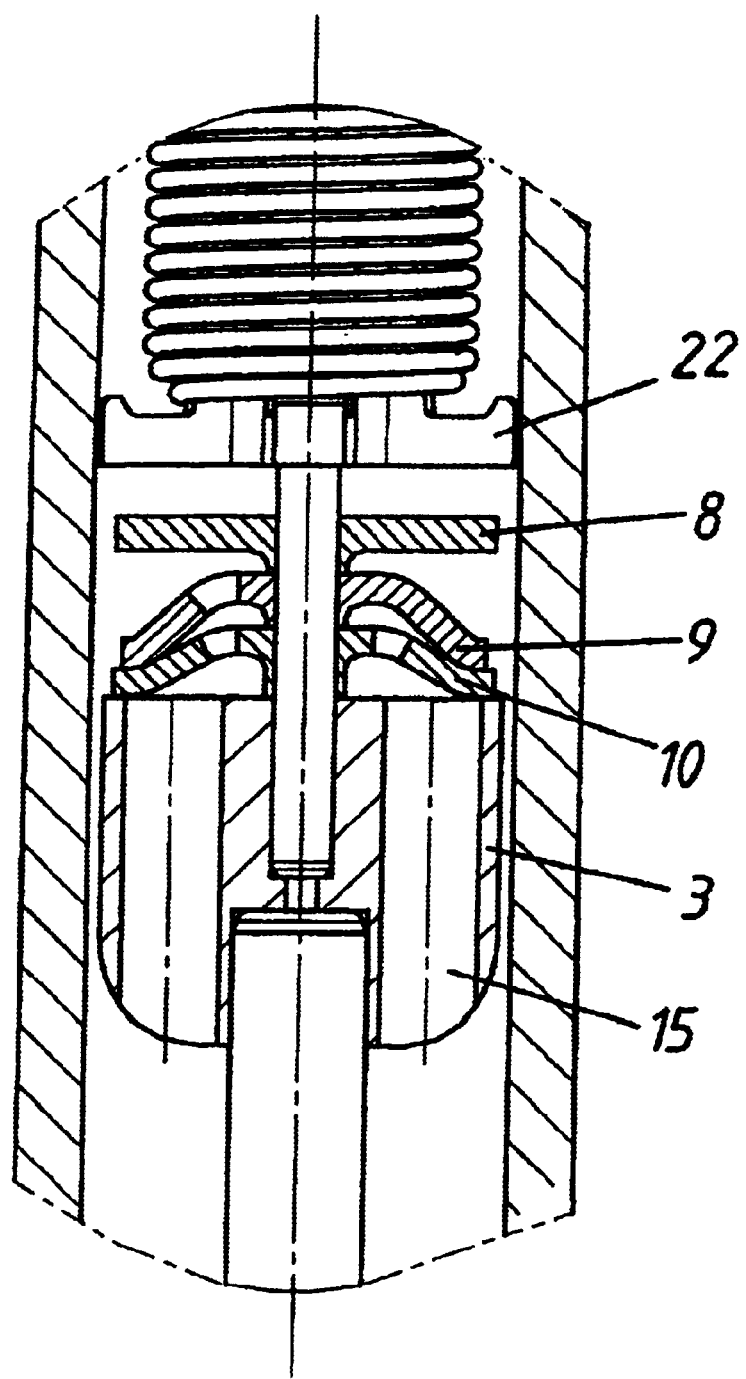
Figure 9:
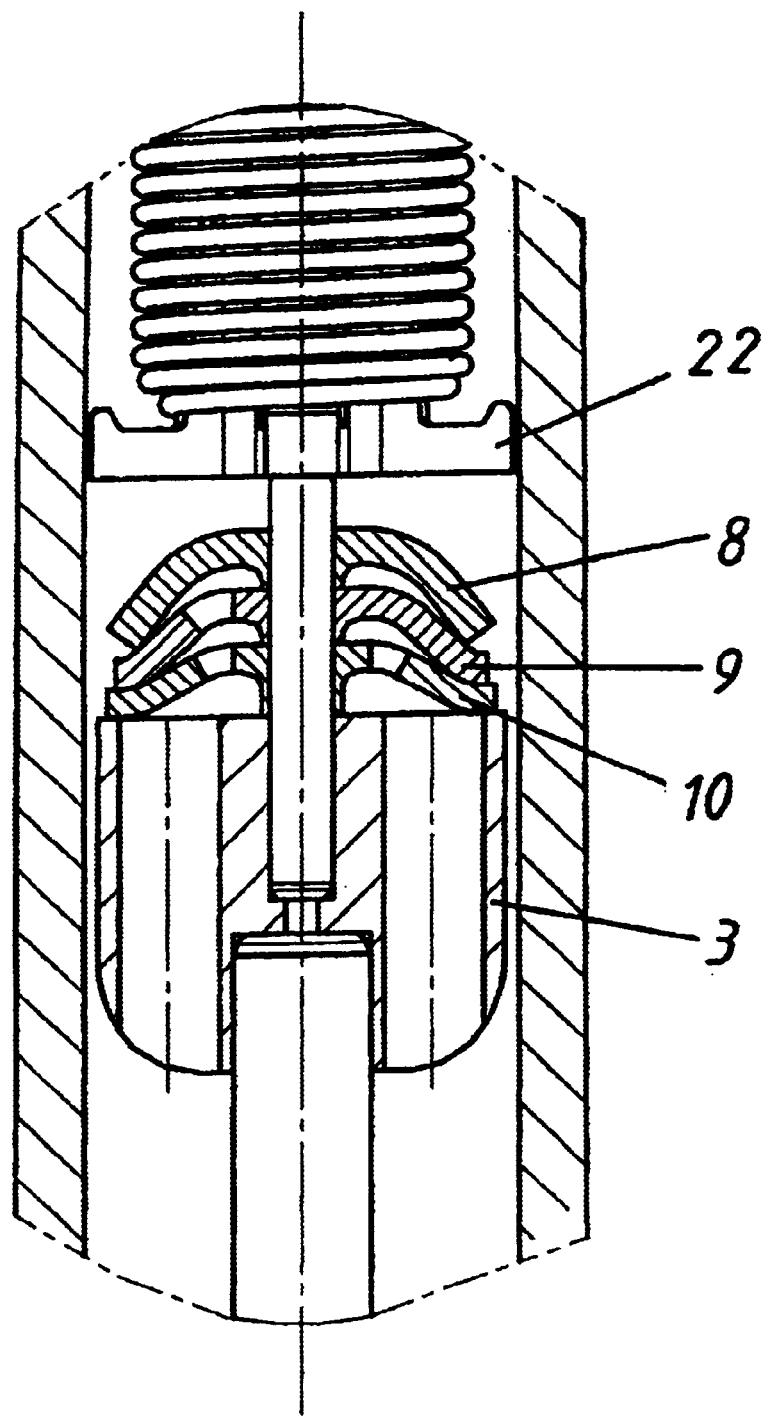

If the piston 3 of the damper is moved at low speed or at the beginning of the damping movement, the ring disks 8, 9, 10 at the pin 21 are displaced towards the piston 3 relative to guide 22. This situation is shown in FIG. 6. Upon further damping movement of the piston 3, first the ring disk 10, as shown in FIG. 7, is bent back towards the piston 3 and thus partly covers the openings 15 in the piston 3. With increasing speed or increasing damping movement, the ring disk 9, as shown in FIG. 8, is also bent, as a result of which the throughflow volume towards the piston 3 is further reduced. Finally or at high speed, the ring disk 8 also bends and thus closes the throughflow to the openings 15 in the ring disks 9, 10 and the piston 3 located behind disk 8. At the same time as the ring disks 8, 9, 10, are bent, the ring projections 18, 19, 20 are bent. This is due to the material and the thickness of the ring projections 18, 19, 20. Because the ring disks 8, 9, 10 move closer together, a better sealing is achieved. Upon the return movement of the piston 3, the gaps between the ring disks 8, 9, 10 are enlarged again and the possible throughflow volume of the damping fluid is increased.

The ring disks 8, 9, 10 are made, as in the previously described embodiment, of a flexible material, preferably from a plastics material and again have different thicknesses and thus different rigidities.

Figure 10:
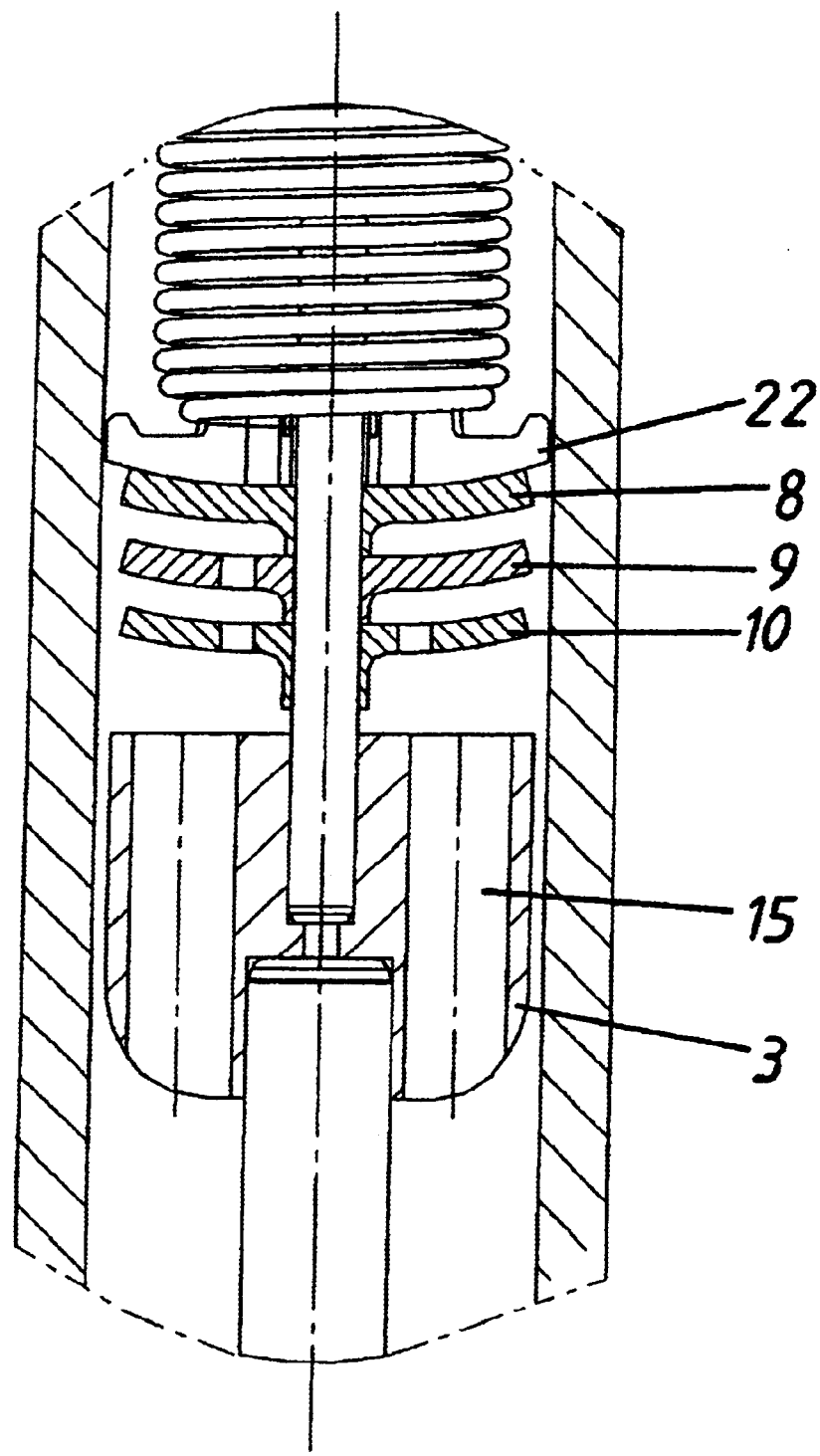
FIG. 10 is a longitudinal section view through a fluid damper in the piston area during the return.

In FIG. 10, the piston 3 is shown during the return movement. The ring disks 8, 9, 10 and the guide 22 are designed such that the ring disks 8, 9, 10 are bent towards the side facing away from the piston 3 (i.e., toward the front).

The openings 15 in the ring disks 8, 9, 10 are deformed during damping and during bending of the ring disks 8, 9, 10 such that they form funnel-shaped nozzles as shown in FIG. 12.

Figure 13:
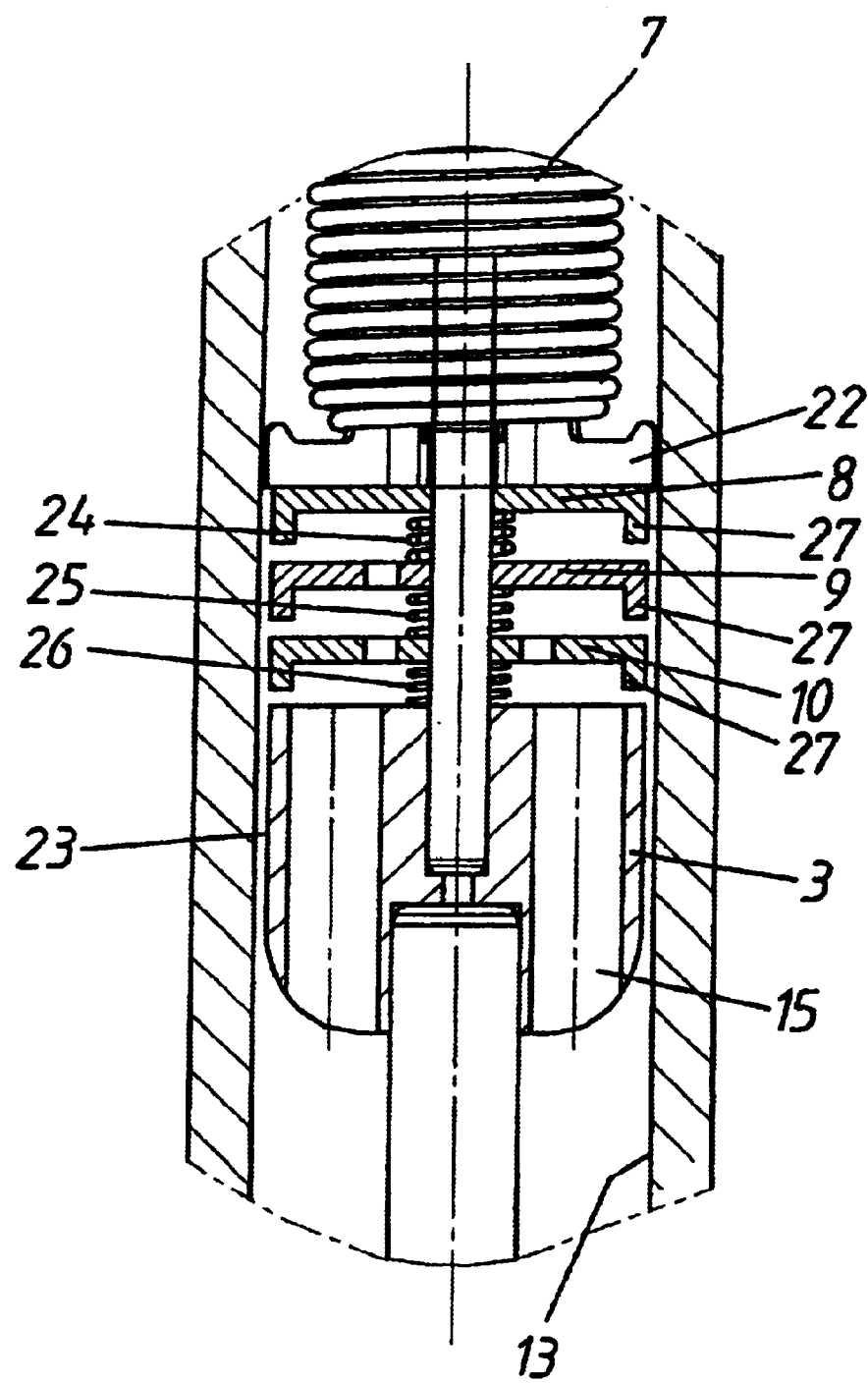
FIG. 13 is a longitudinal section view through a further embodiment of a fluid damper in the resting or return position.
Figure 14:
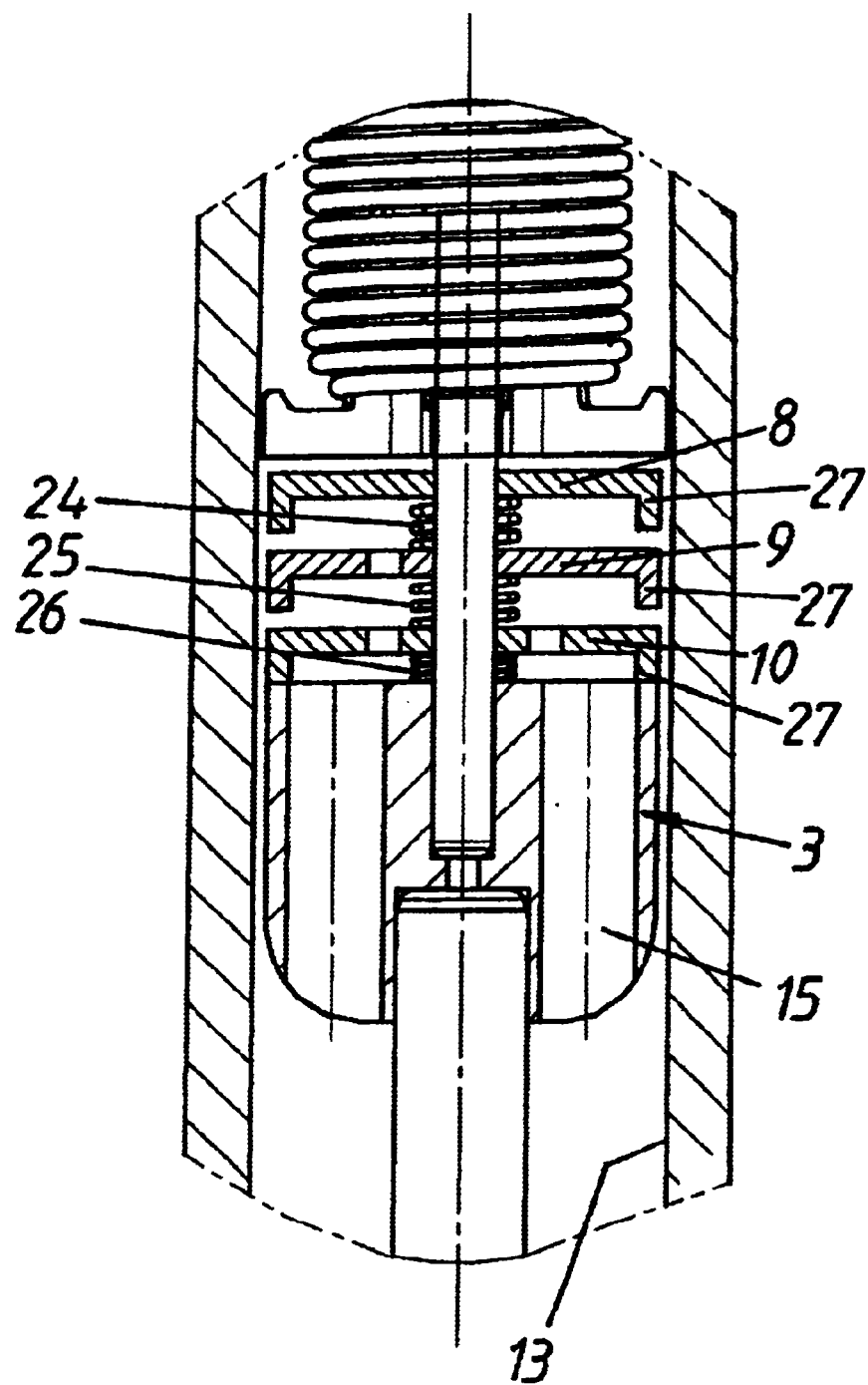
FIGS. 14 to 16 are longitudinal section views through an embodiment of a fluid damper according to FIG. 13 in various damping positions.

In the embodiment according to FIGS. 13 and 14, the ring disks 8, 9, 10 are again developed as separate (not integrally-connected) disks which are axially displaceable along the pin 21. Springs 24, 25, 26 are located between the ring disks 8, 9, 10 and the piston 3 (i.e., a spring located between adjacent rings, and between the piston 3 and the ring 10 closest to the piston 3). The springs 24, 25, 26 are compression and coil springs and in the resting position separate the ring disks 8, 9, 10 from one another and from the piston 3. Analogously to the different rigidities of the ring disks 8, 9, 10 in the embodiments described above, the springs 24, 25, 26 are developed with different thicknesses. Spring 26 is the weakest, spring 25 is thicker and spring 24 is the thickest spring. This is ensures that during the damping stroke of the piston 3, firstly the ring disk 10 moves towards the piston 3 and covers same. The ring disk 9 is then moved towards the ring disk 10 and finally the ring disk 8, which has no opening 1S, towards the ring disk 9.

Similar to the different rigidities of the ring disks 8, 9, 10 in the embodiments described above, the springs 24, 25, 26 are developed with different thicknesses. Third spring 26 (the spring between the piston 3 and the third ring 10 closest to the piston 3) is the weakest, second spring 25 is thicker, and first spring 24 (the spring between the first ring 8 and the second ring 9) is the thickest spring. This ensures that during the damping stroke of the piston 3, first the ring disk 10 moves towards the piston 3 and covers the piston 3. The ring disk 9 is then moved towards the ring disk 10, and finally the ring disk 8, which has no opening 15, moves towards the ring disk 9.

Figure 15:
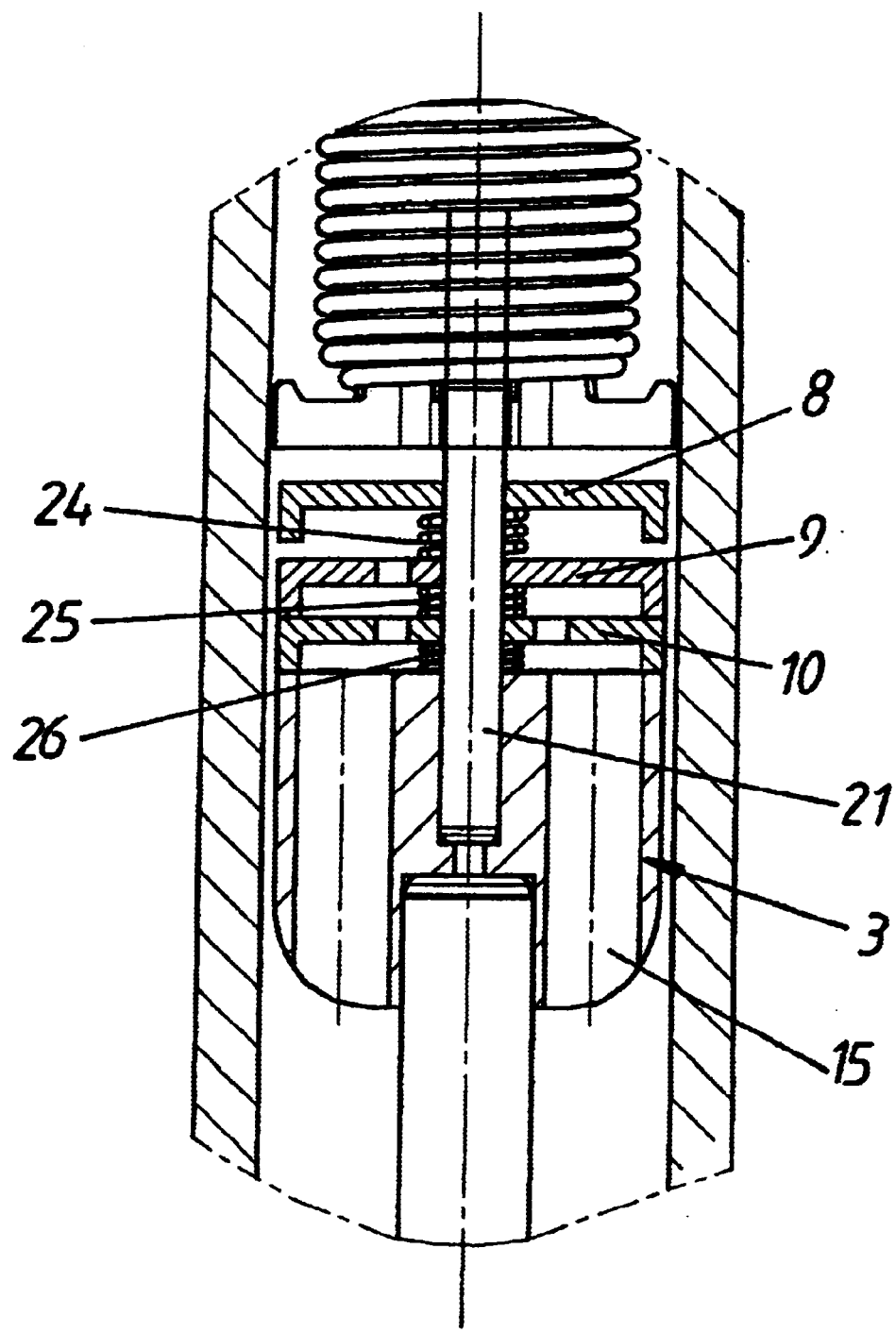
Figure 16:
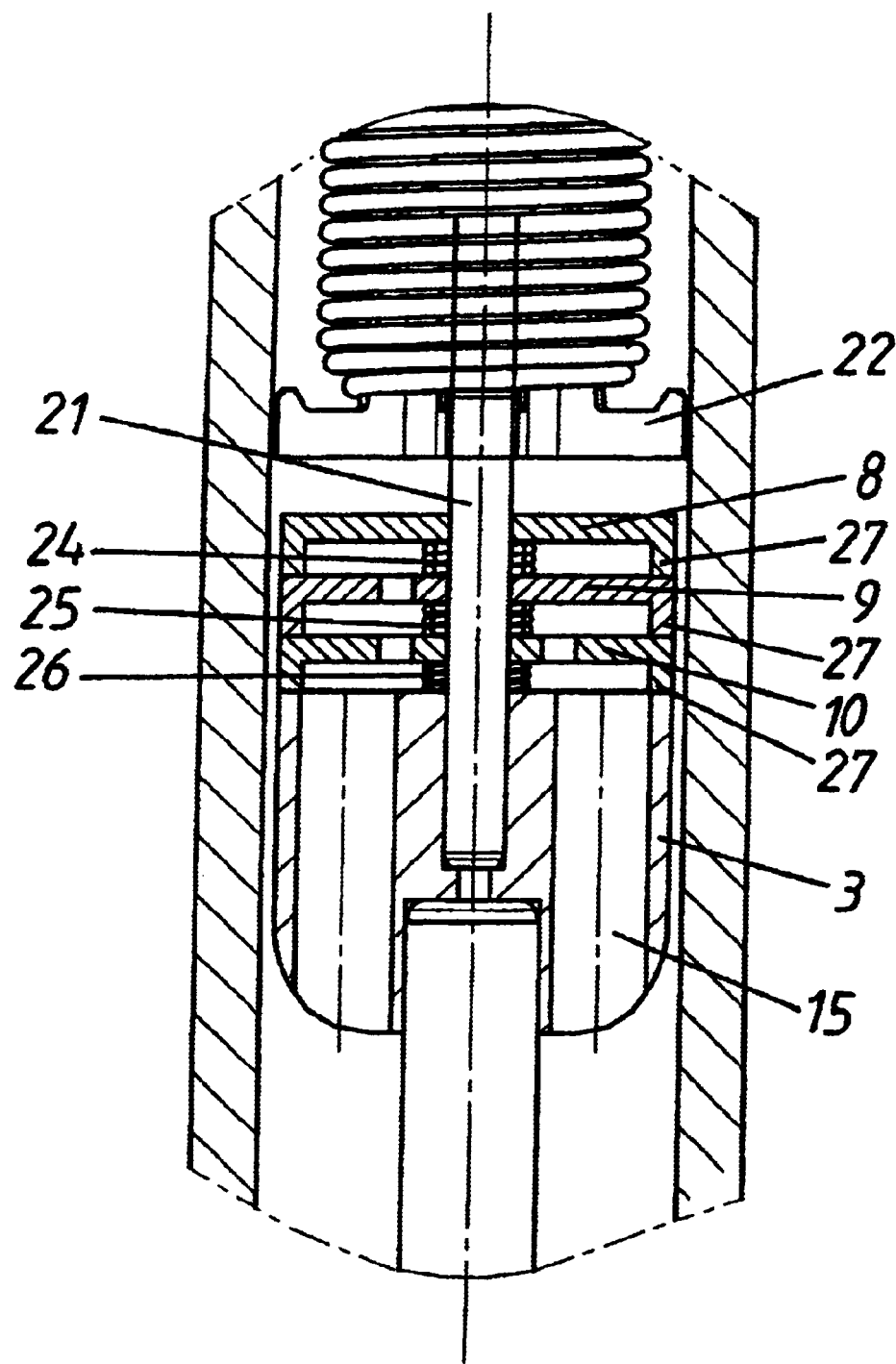

In the embodiment according to FIGS. 13 to 16, the ring disks 8, 9, 10 are inherently rigid, i.e. unbendable. At their extreme periphery, they are provided with a surrounding projecting edge 27. When the ring disk 10, as shown in FIG. 14, rests against the front face of the piston 3, it completely covers the piston 3, and the throughflow quantity of the damping fluid is limited by the two openings 15 in the ring disk 10. When the ring disk 9, as shown in FIG. 15, rests against the ring disk 10, the throughflow quantity of the damping fluid is determined by the one opening 15 in the ring disk 9. In the situation shown in FIG. 16, when the ring disk 8 rests against the ring disk 9, the throughflow through the piston 3 for the damping fluid is blocked, and the damping fluid can now only take the path via the ring gap 23 between piston 3 and the inner housing wall 13.

Figure 17:
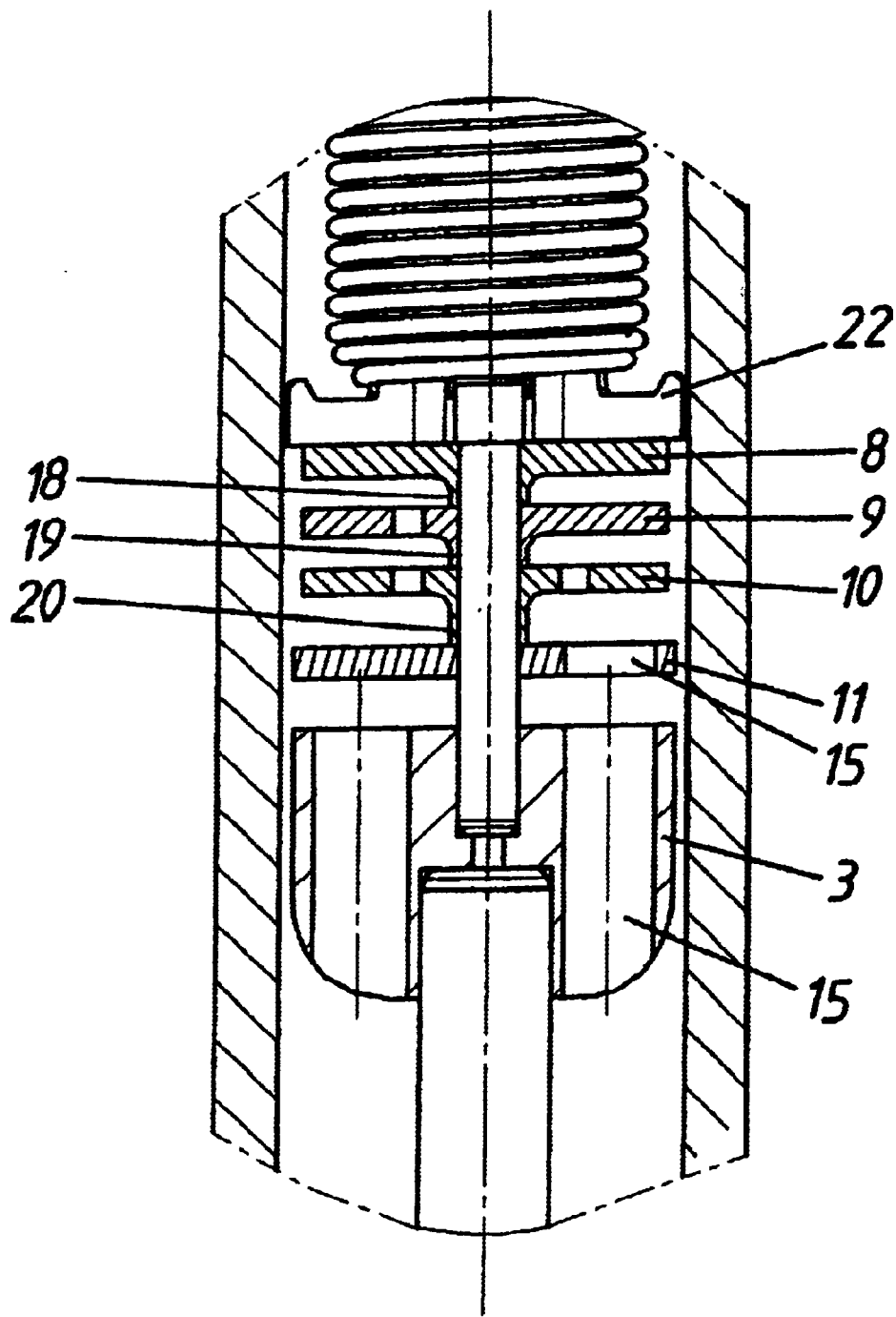
FIG. 17 is a longitudinal section view through a further embodiment of a fluid damper in the area of the piston in the resting and opening positions.

In the embodiment according to FIG. 17, first through third ring disks 8, 9, 10 with ring projections 18, 19, 20, respectively, are arranged on the pin 21 at the hub area so as to be axially displaceable along pin 21. A flat fourth ring disk 11 is located between the ring disk 10 and the piston 3, and (just like the ring disks 8, 9, 10) is axially displaceable along the pin 21. The ring disks 8, 9, 10 are again elastically bendable. Because the ring disk 11 is flat and in the damping position rests snugly against the front face of the piston, no bending of fourth disk 11 occurs.

Figure 18:
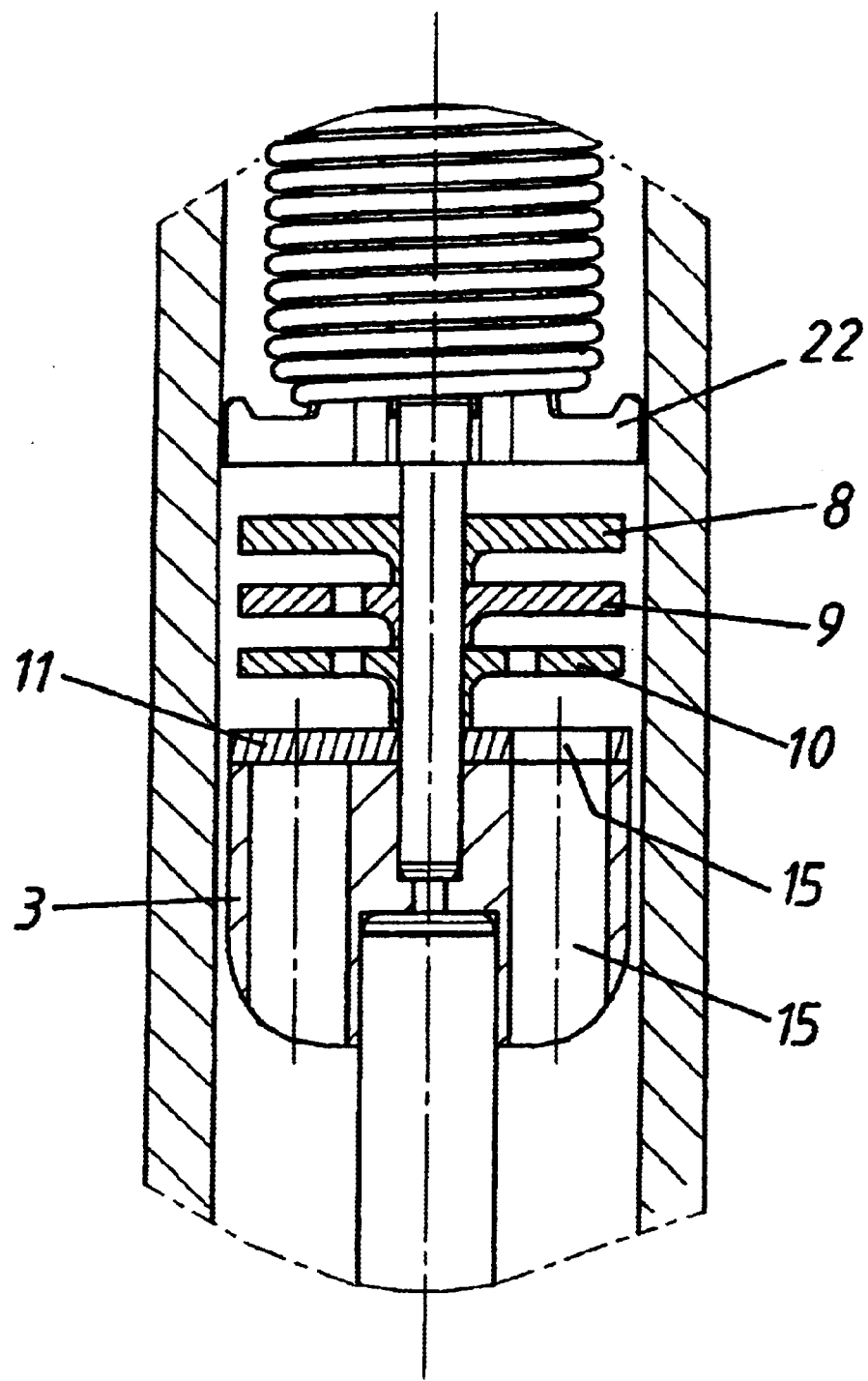
FIGS. 18 to 21 are longitudinal section views through a fluid damper according to FIG. 17 in different stages of damping.
Figure 19:
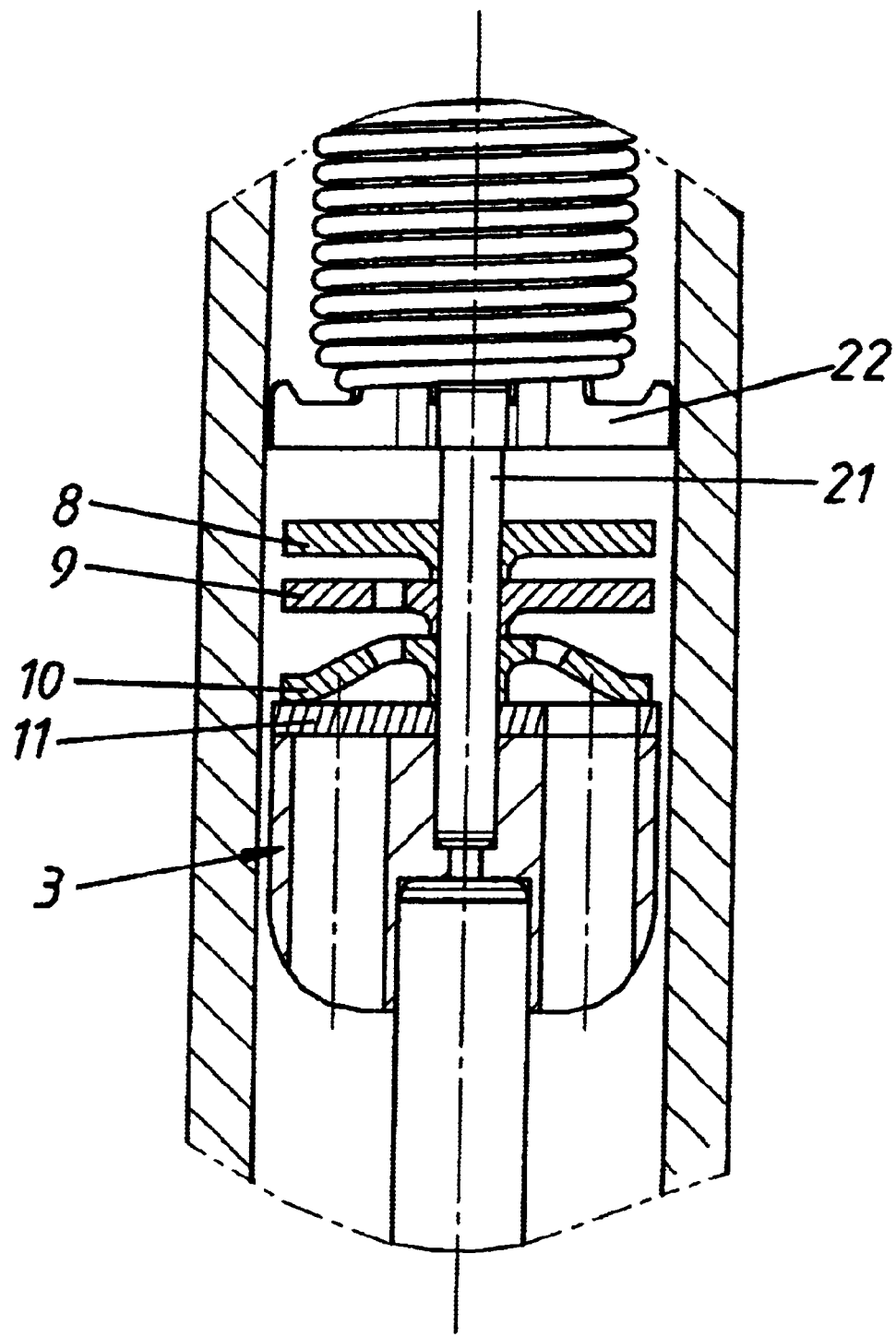
Figure 20:
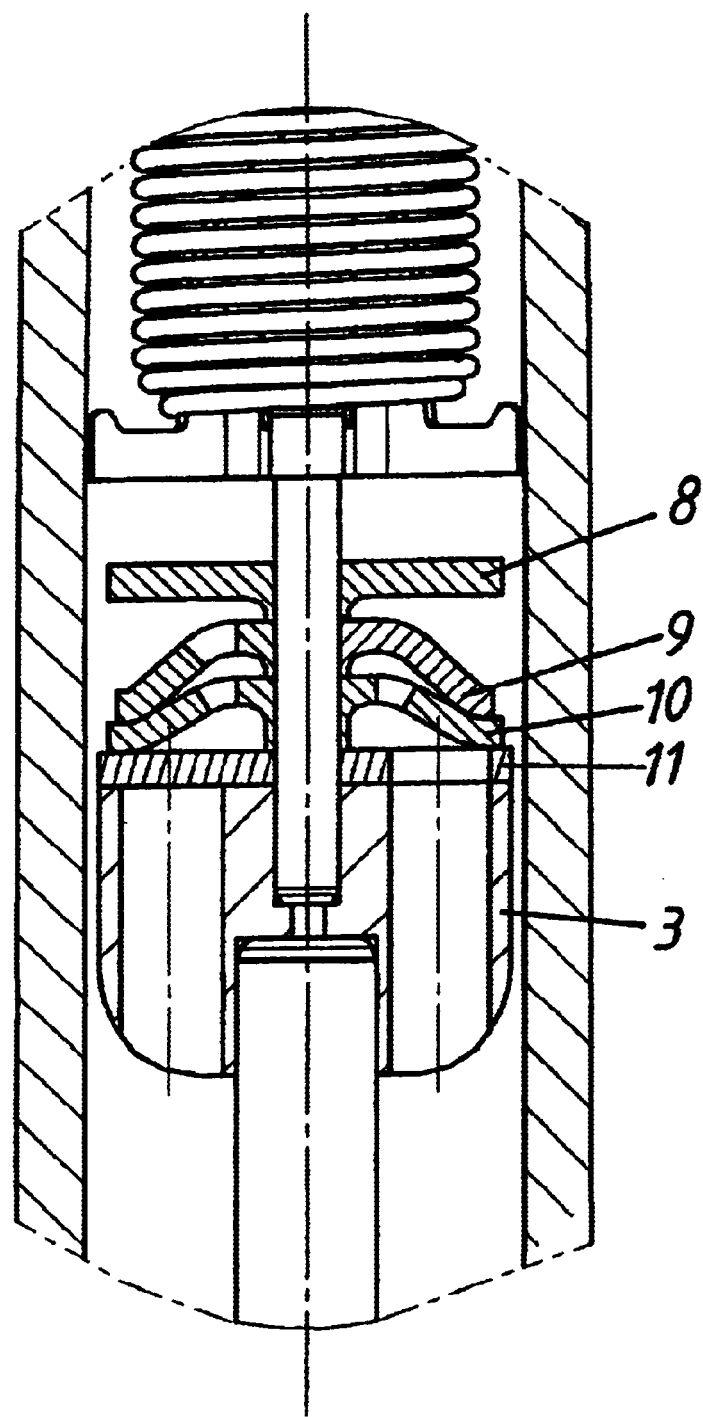

In the embodiment shown, the piston 3 has six openings 15 which are designed as bores. The ring disk 11 is provided with three openings. In FIG. 17, the piston 3 is again shown in the resting and starting position. At the very start of the damping movement, which is shown in FIG. 18, the fourth ring disk 11 strikes the piston 3 and, because the ring disk 11 is provided with only three openings 15, the throughflow volume through the piston 3 is immediately halved. This enables good damping values to be achieved even with a thinner oil. The thinner oil brings with it the advantage that a weaker spring 7 can be used for the return of the piston 3. As damping progresses, the elastically bendable first through third ring disks 8, 9, 10 are bent back towards each other as in the embodiments described above so that the overall cross-section of the openings 15 is progressively reduced to nil.

Figure 21:
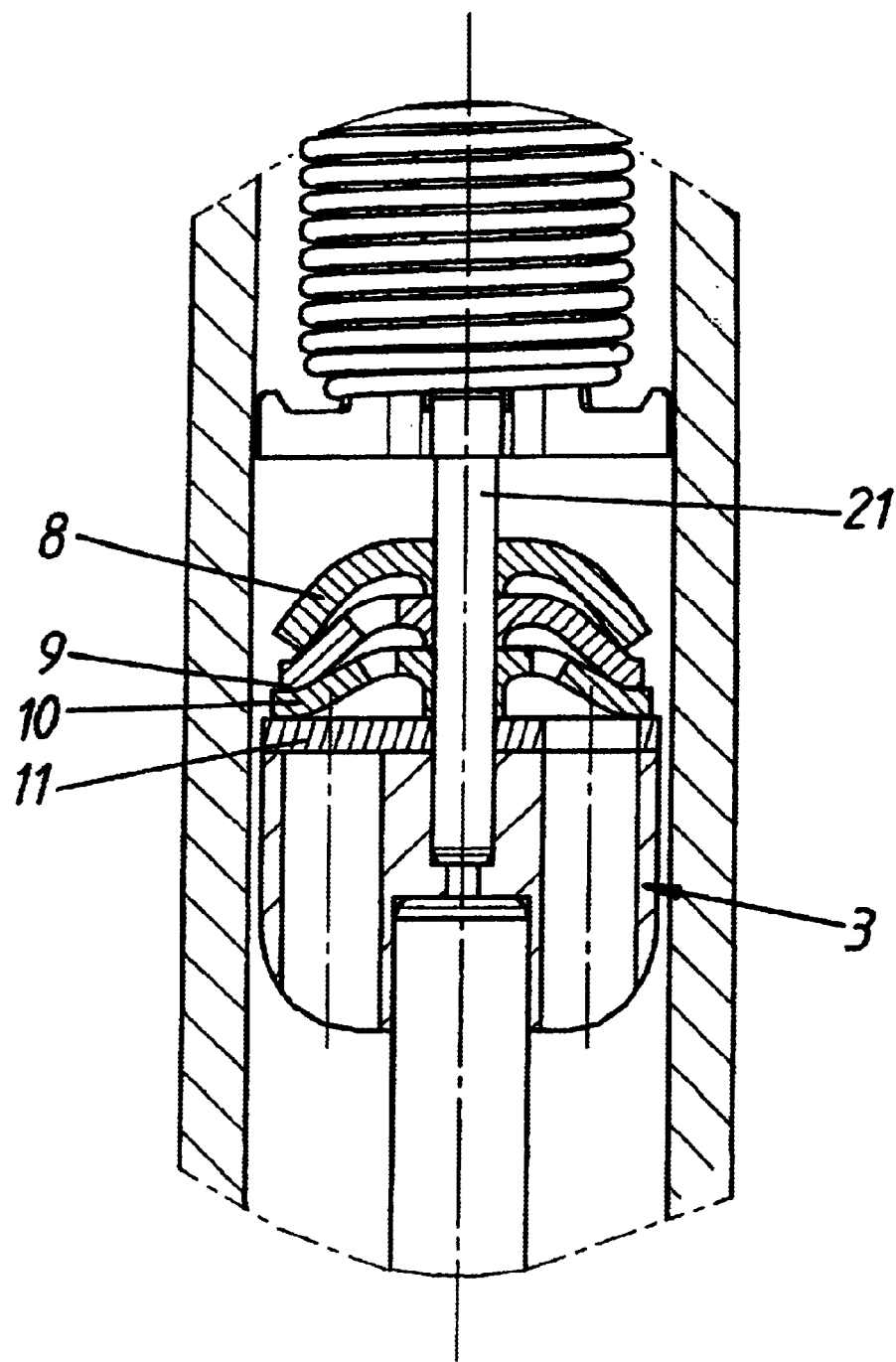
Figure 22:
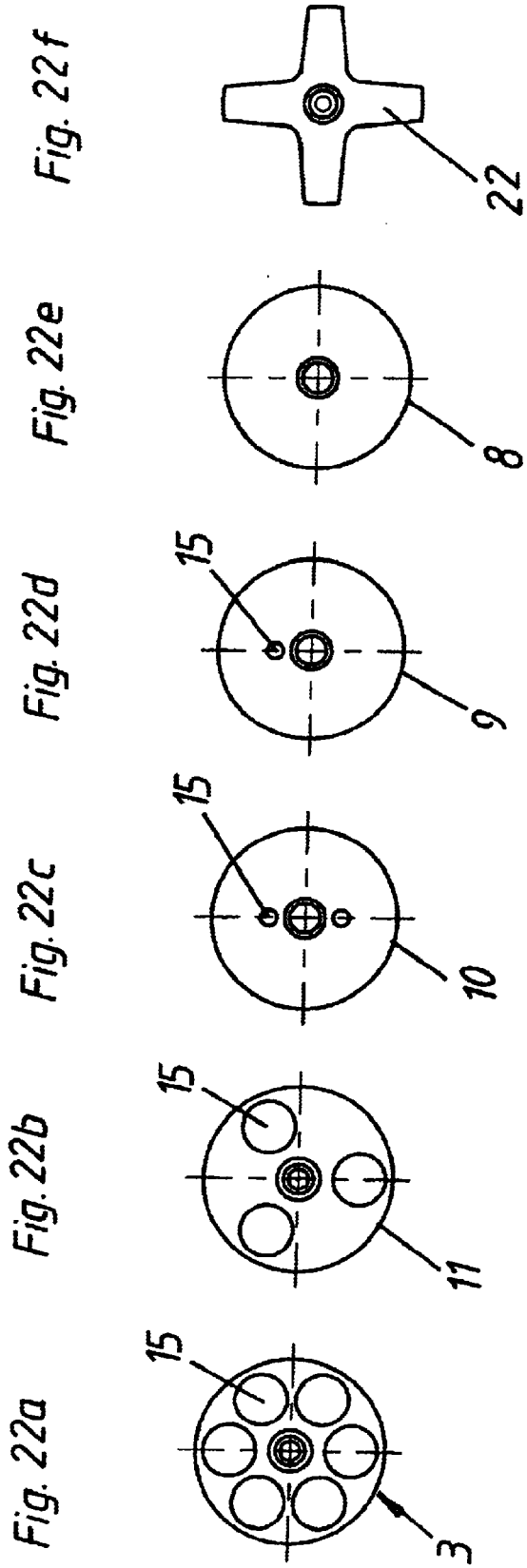
FIG. 22a is a top view of a piston.
FIG. 22b is a top view of the flat ring disk.
FIGS. 22c to 22e are each a top view of a bendable ring disk.
FIG. 22f is a top view of a piston guide.

FIG. 22*a* is a top view of the face of the piston 3, FIG. 22*b* is a top view of the fourth ring disk 11, FIG. 22*c* is a top view of the third ring disk 10, FIG. 22*d* is a top view of the second ring disk 9, FIG. 22*e* is a top view of the first ring disk 8, and FIG. 22*f* a top view of the guide 22. As can be seen from FIG. 22*b*, the fourth ring disk 11 is provided with three openings 15. The ring disk 11 is preferably held in a rotation-resistance manner on the pin 21 so that the openings 15 in the ring disk 11 match openings 15 in the piston 3. If the ring disk 11 rests against the face of the piston 3, the damping fluid can now only flow through the three openings 15 in the ring disk 11, and the overall cross-section of the openings 15 is thereby halved. Bending the third ring disk 10 causes a further throttling which is continued by bending the second ring disk 9. In the position shown in FIG. 21, the first ring disk 8 closes the complete throughflow through the piston 3.

Figure 23:
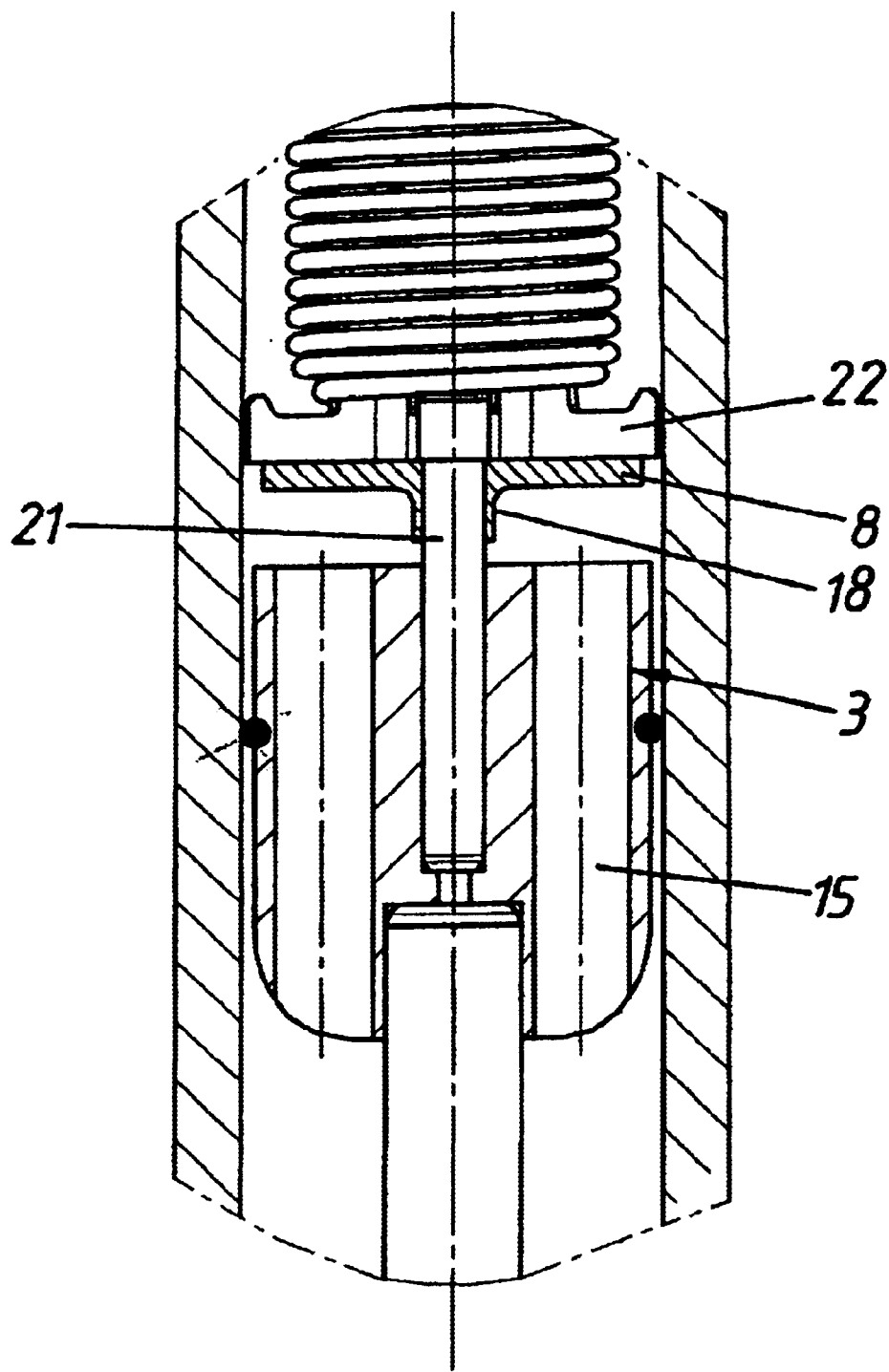
FIG. 23 is a longitudinal section view through a further embodiment of a fluid damper in the area of the piston in the resting position.
Figure 24:
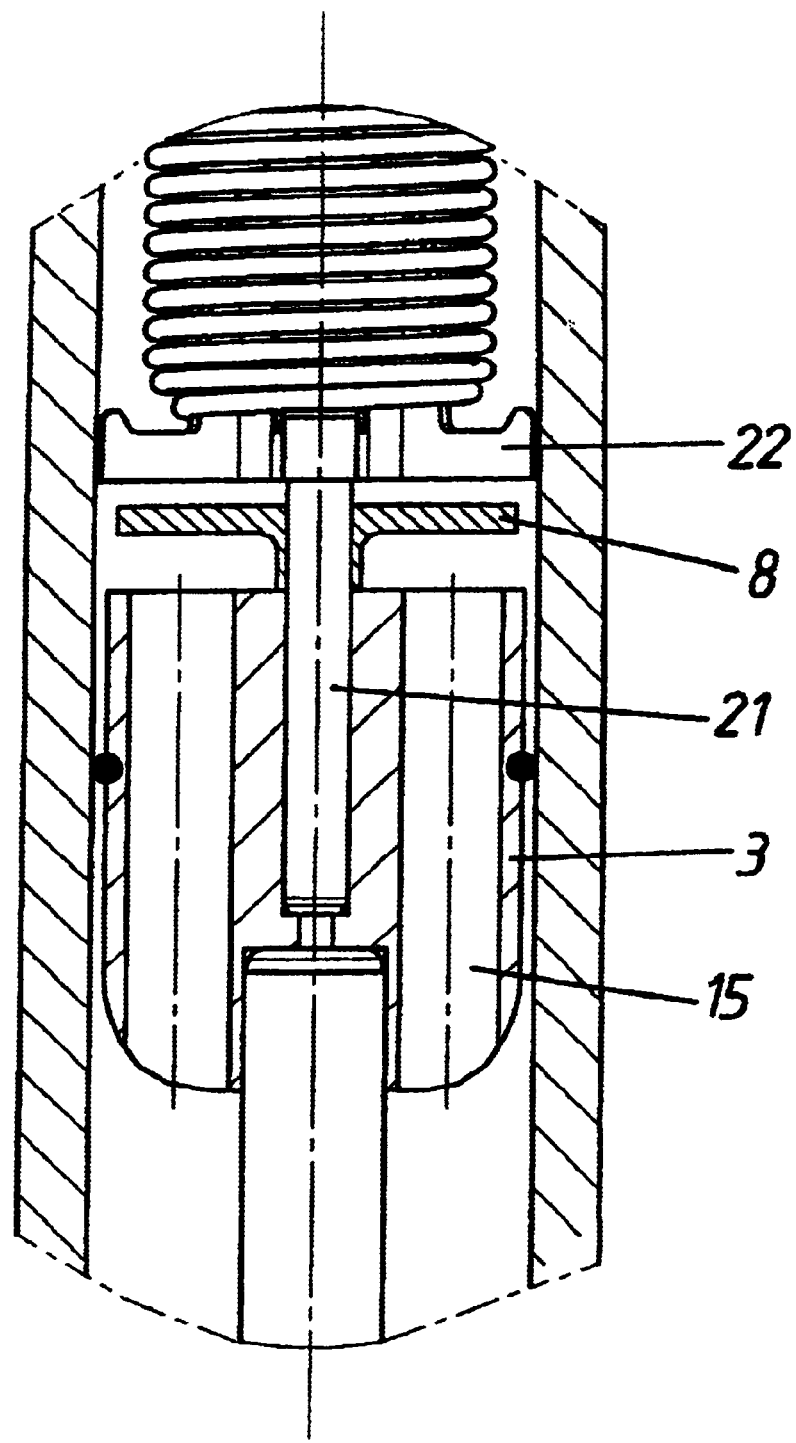
FIGS. 24 and 25 are longitudinal section views through a fluid damper according to FIG. 23 in various stages of damping.
Figure 25:
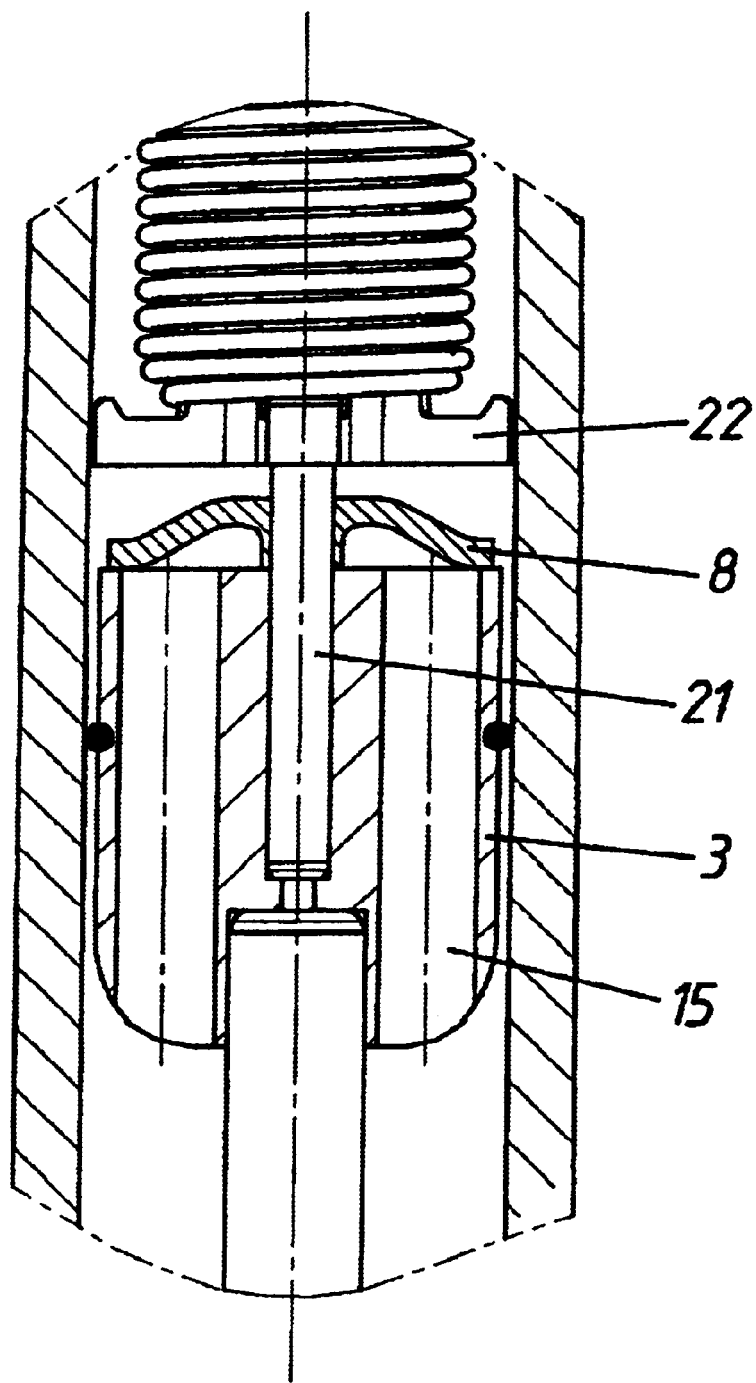

In the embodiment according to FIGS. 23 to 25, the piston 3 is provided with only one ring disk 8, which has no opening 15. During the damping process, the ring disk 8 is first displaced along the pin 21 from the position shown in FIG. 23 to the position shown in FIG. 24, whereat it rests with its ring projection 18 against the front face of the piston 3. The ring disk 8 is then bent, as shown in FIG. 25, as a result of which the openings 15 in the piston 3 are covered.

Figure 26:
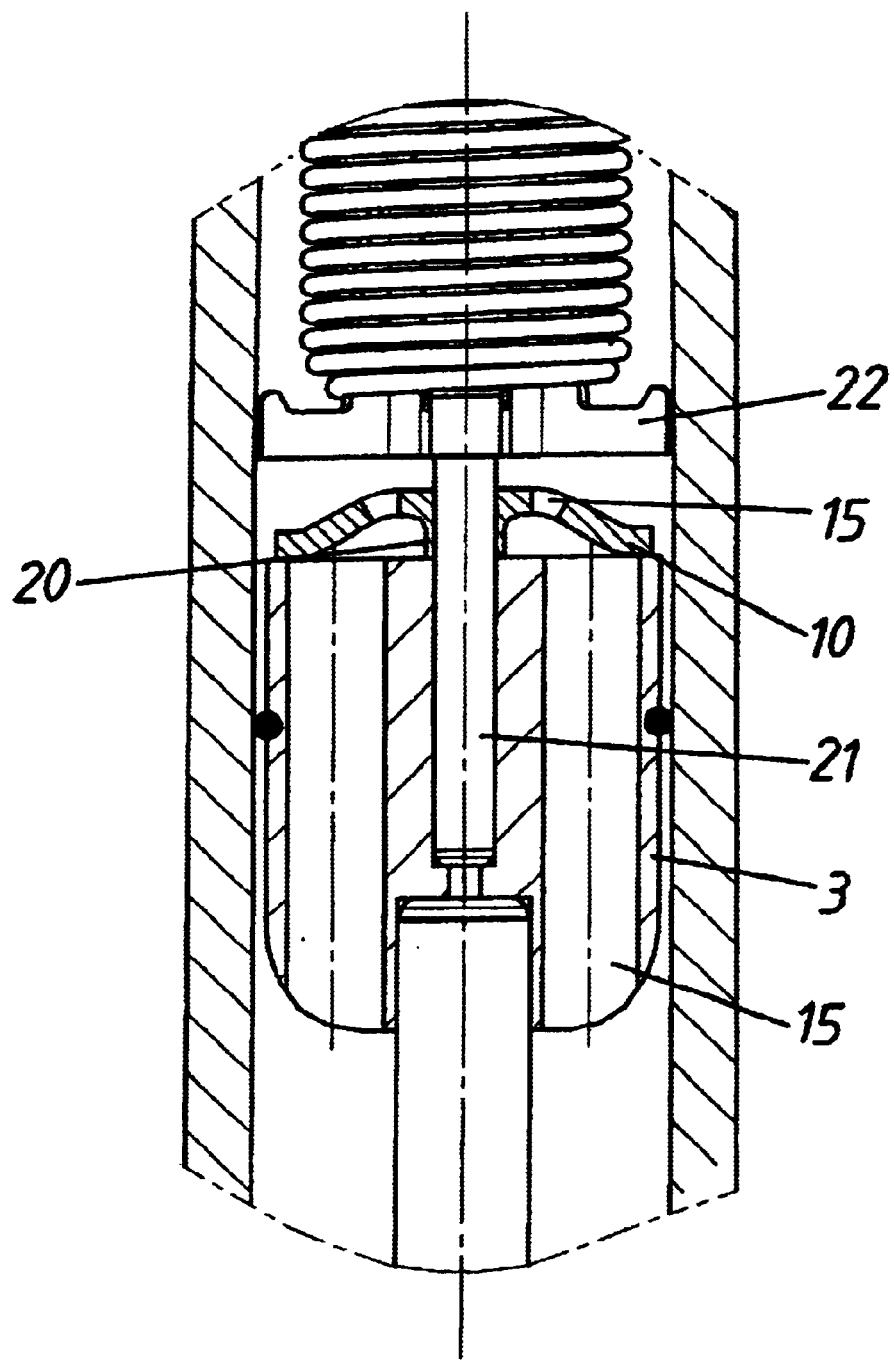
FIG. 26 is a longitudinal section view through a further embodiment of a fluid damper during damping.

In the embodiment according to FIG. 26, the piston 3 is likewise provided with only one ring disk 10. However the ring disk 10 has two openings 15. The throughflow for the damping fluid through the piston 3 is therefore never stopped completely.

Figure 27:
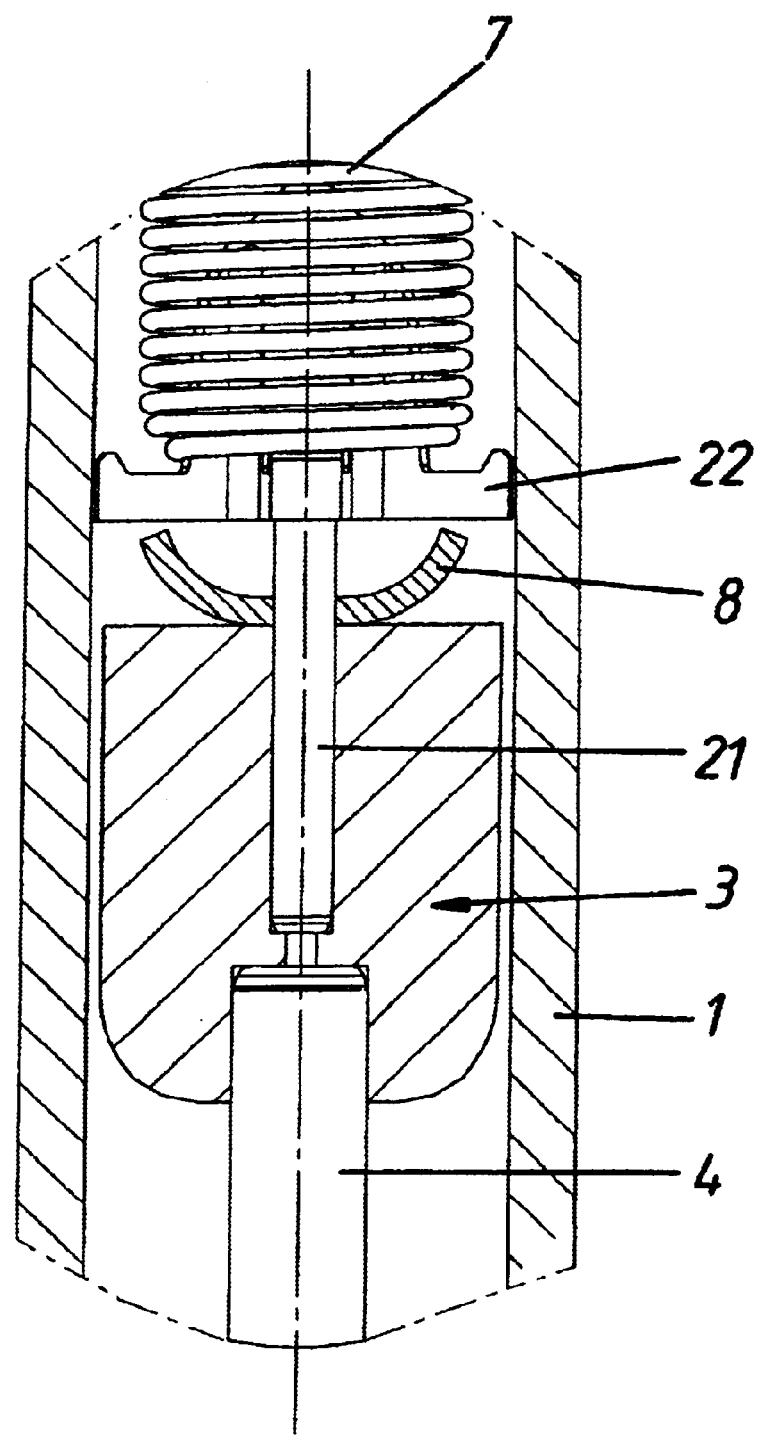
FIG. 27 is a longitudinal section view through a further embodiment of a fluid damper in the area of the piston in the resting position.
Figure 28:
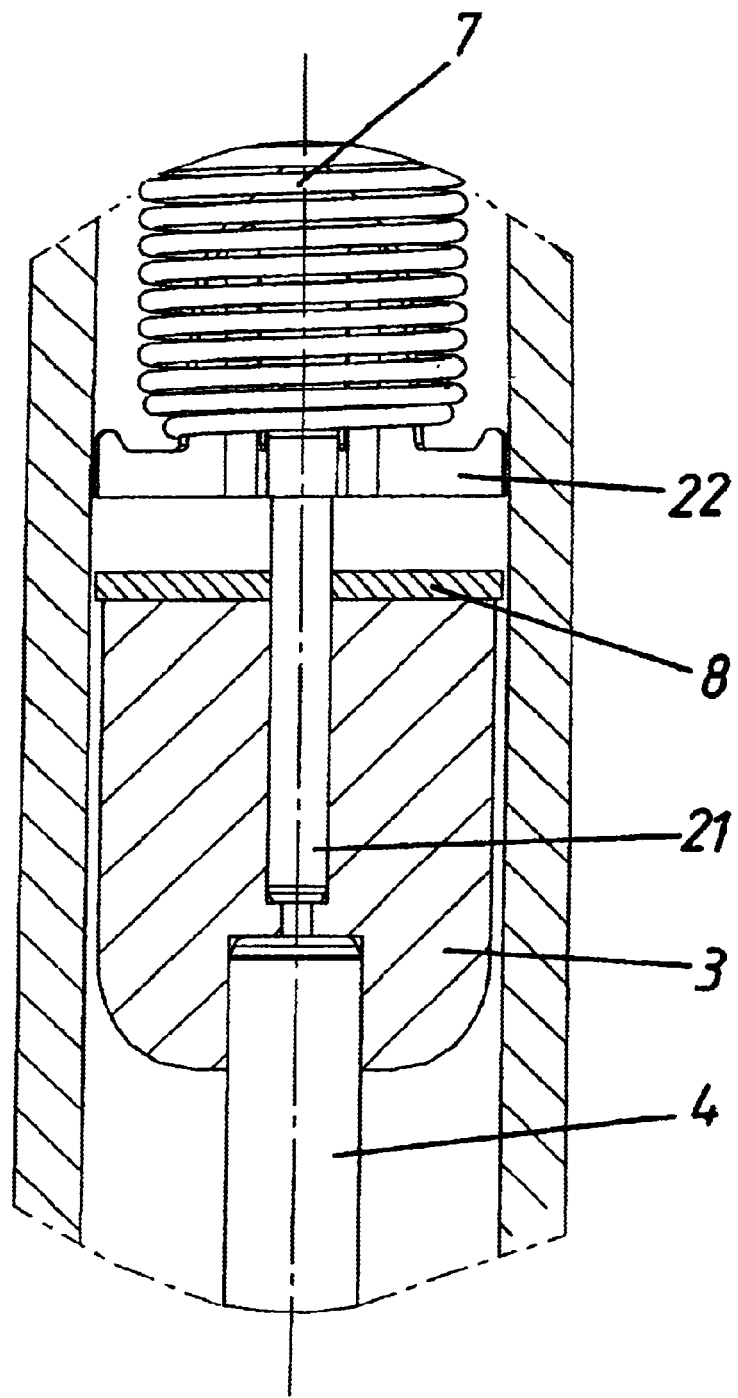
FIG. 28 is a longitudinal section view through a fluid damper in the area of the piston according to the embodiment according to FIG. 27 during damping.

In the embodiment according to FIGS. 27 and 28, a ring disk 8 is provided with an inherent tension which, in the resting position as shown in FIG. 27, causes it to stand out from the face of the piston 3. During the damping stroke of the piston 3, the ring disk 8 is bent back so that, as shown in FIG. 28, it lies flat against the piston 3 and thus closes all the openings 15 in the piston 3. The openings 15 are not shown in FIGS. 27 and 28.

What is claimed is:

1. A fluid damper comprising:
   a cylinder having a cylinder chamber;
   a piston linearly movable in said cylinder chamber, said piston having at least one opening to allow a flow of a damping fluid through said piston; and
   a plurality of movable ring disks at said piston in said cylinder chamber, at least two of said ring disks each having an opening to allow a flow of the damping fluid through said at least two of said ring disks, said ring disks being arranged so as to gradually reduce the flow of the damping fluid through said at least one opening in said piston during a damping stroke of said piston by each of said ring disks at least partially covering openings in other of said ring disks and in said piston behind said each of said ring disks with respect to a damping stroke direction of said piston.

2. The fluid damper of claim 1, wherein said at least one opening of said piston comprises at least one hole in a body of said piston.

3. The fluid damper of claim 1, wherein said plurality of ring disks comprises three ring disks, two of said three ring disks each having at least one opening to allow a flow of the damping fluid through said two ring disks.

4. The fluid damper of claim 1, wherein said ring disks are arranged at a front side of said piston with respect to the damping stroke direction.

5. The fluid damper of claim 1, further comprising a piston rod connected to a first side of said piston, said ring disks being arranged at a second side of said piston opposite said first side.

6. The fluid damper of claim 1, wherein at least two of said ring disks are elastically bendable during the damping stroke.

7. The fluid damper of claim 6, wherein at least two of said ring disks have different rigidities.

8. The fluid damper of claim 7, wherein said ring disks have different thicknesses.

9. The fluid damper of claim 6, wherein each of said elastically bendable ring disks are made of rubber material or plastic material.

10. The fluid damper of claim 6, wherein said at least two elastically bendable ring disks are arranged so as to form ring gaps between said at least two elastically bendable ring disks and a wall of said cylinder chamber.

11. The fluid damper of claim 1, wherein said ring disks are movable in an axial direction.

12. The fluid damper of claim 11, wherein said piston has a pin, said ring disks being axially movably arranged on said pin.

13. The fluid damper of claim 1, wherein each of said ring disks is operable to bend so as to at least partially cover said openings in said ring disks and said piston behind said each of said ring disks.

14. The fluid damper of claim 1, wherein each of said ring disks has a larger number of openings than one of said ring disks directly in front of said each of said ring disks with respect to the damping stroke direction of said piston.

15. The fluid damper of claim 1, wherein said plurality of ring disks includes a front ring disk with respect to the damping stroke direction of said piston, said front ring disk having no openings formed therein.

16. The fluid damper of claim 15, wherein said front ring disk is elastically bendable.

17. The fluid damper of claim 1, wherein each of said ring disks has a ring projection at a hub area.

18. The fluid damper of claim 17, further comprising a flat disk directly in front of said piston and behind said ring disks with respect to the damping stroke direction of said piston, said flat disk being arranged on a pin extending from said piston so as to be freely axially movable on said pin.

19. The fluid damper of claim 1, further comprising springs, one of said springs being arranged between each adjacent pair of said ring disks, and one of said springs being arranged between said piston and one of said ring disks closest to said piston.

20. The fluid damper of claim 19, wherein said springs have different thicknesses.

21. The fluid damper of claim 20, wherein a weakest one of said springs is arranged between said piston and said one of said ring disks closest to said piston, and a strongest one of said springs is located between a front one of said ring disks and a ring disk adjacent to said front one of said spring disks.

22. The fluid damper of claim 1, wherein each of said ring disks has a peripheral ring projection.

23. The fluid damper of claim 1, further comprising at least one spring, one of said at least one spring being arranged between at least one adjacent pair of said ring disks.

24. A fluid damper comprising:

a cylinder having a cylinder chamber;

a piston linearly movable in said cylinder chamber, said piston having at least one opening to allow a flow of a damping fluid through said piston; and three movable ring disks at said piston in said cylinder chamber, a first one of said ring disks farthest from said piston having no openings, a second one of said ring disks adjacent to said first one of said ring disks having one opening, and a third one of said ring disks adjacent to said second one of said ring disks having two openings, said ring disks being arranged so as to gradually reduce the flow of the damping fluid through said at least one opening in said piston during a damping stroke of said piston.

25. The fluid damper of claim 24, wherein a total cross-sectional area of said two openings of said third ring disk are approximately half as large as a total cross-sectional area of said at least one opening of said piston.

26. A fluid damper comprising:

a cylinder having a cylinder chamber;

a piston linearly movable in said cylinder chamber, said piston having at least one opening to allow a flow of a damping fluid through said piston; and at least one movable ring disk at said piston in said cylinder chamber, said at least one ring disk being arranged so as to gradually reduce the flow of the damping fluid through said at least one opening in said piston during a damping stroke of said piston by each of said at least one ring disk at least partially covering openings in said at least one ring disk and in said piston being said each of said at least one ring disk with respect to a damping stroke direction of said piston.

27. The fluid damper of claim 26, wherein each of said at least one ring disk is shaped to form a ring gap between each of said at least one ring disk and a wall of said cylinder chamber.

28. The fluid damper of claim 26, wherein said piston is shaped to form a ring gap between said piston and a wall of said cylinder chamber.

* * * * *